United States Patent
Matsushita et al.

(10) Patent No.: US 8,014,287 B2
(45) Date of Patent: Sep. 6, 2011

(54) COMMUNICATIONS APPARATUS

(75) Inventors: Yosuke Matsushita, Osaka (JP);
Yoshinori Okazaki, Osaka (JP); Hiroshi Kurata, Hyogo (JP)

(73) Assignee: Panasonic Corporation, Osaka (JP)

( * ) Notice: Subject to any disclaimer, the term of this patent is extended or adjusted under 35 U.S.C. 154(b) by 316 days.

(21) Appl. No.: 12/438,022

(22) PCT Filed: Aug. 20, 2007

(86) PCT No.: PCT/JP2007/066097
§ 371 (c)(1),
(2), (4) Date: Feb. 19, 2009

(87) PCT Pub. No.: WO2008/023656
PCT Pub. Date: Feb. 28, 2008

(65) Prior Publication Data
US 2010/0232427 A1    Sep. 16, 2010

(30) Foreign Application Priority Data
Aug. 23, 2006    (JP) .................................. 2006-226176

(51) Int. Cl.
*G01R 31/08* (2006.01)
(52) U.S. Cl. ........................ 370/235; 370/394; 370/412
(58) Field of Classification Search .................. 370/229, 370/230, 231, 235, 252, 389, 394, 412; 709/230, 709/231, 232, 236, 238, 250
See application file for complete search history.

(56) References Cited

U.S. PATENT DOCUMENTS
| | | | | |
|---|---|---|---|---|
| 5,852,602 A | | 12/1998 | Sugawara | |
| 6,438,101 B1* | | 8/2002 | Kalampoukas et al. | 370/229 |
| 6,496,481 B1* | | 12/2002 | Wu et al. | 370/242 |
| 6,950,393 B1* | | 9/2005 | Ben Nun et al. | 370/229 |
| 2002/0099900 A1* | | 7/2002 | Kawarai et al. | 710/317 |
| 2002/0181494 A1* | | 12/2002 | Rhee | 370/465 |

(Continued)

FOREIGN PATENT DOCUMENTS
JP    9-205442    8/1997

(Continued)

OTHER PUBLICATIONS
International Search Report issued Nov. 20, 2007 in the International (PCT) Application of which the present application is the U.S. National Stage.

(Continued)

*Primary Examiner* — Jung Park
(74) *Attorney, Agent, or Firm* — Wenderoth, Lind & Ponack, L.L.P.

(57) ABSTRACT

A communications apparatus, enabling an efficient data transfer without an environmental restriction, notifies a transmission-side apparatus connected via a network of data amount in a window size, and receives data as large as the window size, the data which is transmitted from the transmission-side apparatus. The communications apparatus includes: a receiving buffer memory having a region for storing a data packet transmitted from the transmission-side apparatus; a communications protocol processing unit notifying the transmission-side apparatus of the window size larger than a capacity of the receiving buffer memory, receiving the data packet transmitted from the transmission-side apparatus according to the notified window size, and storing the received data packet in the receiving buffer memory; and a central controlling unit retrieving the data packet stored in the receiving buffer memory and processing the retrieved data packet.

18 Claims, 18 Drawing Sheets

U.S. PATENT DOCUMENTS

| | | | |
|---|---|---|---|
| 2003/0202517 A1* | 10/2003 | Kobayakawa et al. | 370/395.4 |
| 2004/0013115 A1* | 1/2004 | Su et al. | 370/392 |
| 2007/0025250 A1* | 2/2007 | Shimonishi et al. | 370/231 |
| 2007/0076726 A1* | 4/2007 | Weston et al. | 370/401 |
| 2007/0121511 A1* | 5/2007 | Morandin | 370/235 |

FOREIGN PATENT DOCUMENTS

| | | |
|---|---|---|
| JP | 9-233082 | 9/1997 |
| JP | 9-247209 | 9/1997 |
| JP | 2005-109765 | 4/2005 |

* cited by examiner

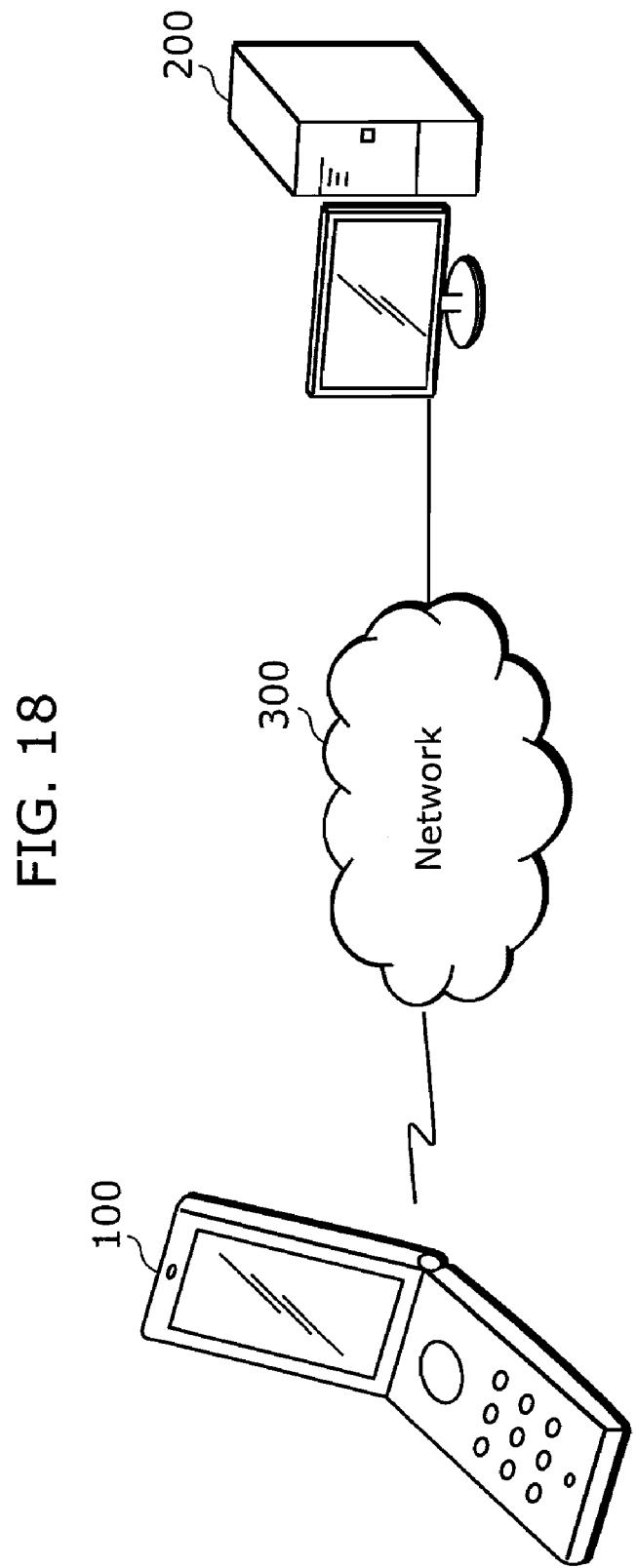

COMMUNICATIONS APPARATUS

TECHNICAL FIELD

The present invention relates to communications apparatuses, and particularly to a communications apparatus for receiving a data, utilizing the TPC/IP (Transmission Control Protocol/Internet Protocol).

BACKGROUND ART

On data transfer in the TPC/IP network, data is transmitted and received in a unit referred to as packet.

A transmission-side apparatus transmits a packet to a reception-side apparatus. When receiving a packet transmitted from the transmission-side apparatus, the reception-side apparatus transmits a positive acknowledgement packet (Acknowledgement Packet: hereinafter referred to as an ACK packet) to the transmission-side apparatus. Receiving the ACK packet transmitted from the reception-side apparatus, the transmission-side apparatus acknowledges the fact that the packet transmitted by the transmission-side apparatus is received by the reception-side apparatus.

The amount of available data to continuously be transmitted to the reception-side apparatus without receiving the ACK packet is limited by a window size. Setting a maximum amount of the data which the reception-side apparatus receives as an upper limit (RWIN), a typical window size is increased and decreased depending on a congestion state of a network. Ideally, the window size is stable at a value RWIN with no network congestion.

Thus, when the reception-side apparatus transmits the data to a reception apparatus via the network, transmission processing by the transmission-side apparatus is blocked only for a time between the transmission-side apparatus transferring data as large as the window size and the reception-side apparatus receiving the ACK packet (Round Trip Time: referred to as RTT, hereinafter).

Here, when the transmission-side apparatus transmits the data to the reception-side apparatus via a network having a great transfer delay, a problem occurs in that the data cannot be efficiently transferred (high data transfer rate) due to a long RTT.

This problem is highlighted especially when an apparatus referred to as a "network appliance" such as a home appliance (a refrigerator and a microwave), including a network connecting function, is utilized as the reception-side apparatus. In other words, the above-described problem is highlighted because a typical communications memory (receiving buffer memory) for the network appliance is small, and thus available space of the communications memory is set to RWIN.

Transmission-side apparatuses for solving the above problem have conventionally been proposed (See Patent Reference 1, for example). A transmission-side apparatus in Patent Reference 1 converts a delay time of a network into a virtual window size, utilizing a TCP/IP control, and adds the virtual window size to the above window size. Then, the transmission-side apparatus sets a resulting size of the addition as a new window size, and transmits data in accordance with the new window size. This achieves an efficient data transfer.

FIG. 1 shows a structure of a transmission-side apparatus in the above-described Patent Reference 1.

A transmission-side apparatus 920 in the above Patent Reference 1 is connected to a reception-side apparatus 910 via a network.

In addition, the transmission-side apparatus 920 includes, for example, a central controlling unit 921 executing an application program, a main memory 922 storing data necessary to execute the program, and communications controlling unit 923 communicating in accordance with the TCP/IP.

The communications controlling unit 923 includes a transmitting buffer memory 925 for storing data to be transmitted to the reception-side apparatus 910, a virtual buffer adding unit 926 adding the above-described virtual window size, and a communications protocol processing unit 924 transmitting the data stored in the transmitting buffer memory 925 to the reception-side apparatus 910.

When notified of a window size from the reception-side apparatus 910, the communications protocol processing unit 924 notifies the virtual buffer adding unit 926 of the window size.

In the case where the notified window size is small, the virtual buffer adding unit 926 renews the window size by adding the virtual window size to the window size.

The communications protocol processing unit 924 retrieves the data as large as the window size, renewed by the virtual buffer adding unit 926, and transmits the data to the reception-side apparatus 910.

This encourages the transmission-side apparatus 920 to transmit as large amount of data as possible within the RTT by increasing the window size even though the window size notified from the reception-side apparatus 910 is small.

Meanwhile, reception-side apparatuses for solving the above problem have been proposed (See Patent Reference 2, for example). The reception-side apparatus in Patent Reference 2 compensates for a deficiency of a receiving buffer memory out of a main memory, utilizing a TCP/IP control, and notifies a transmission-side apparatus of a capacity, of the receiving buffer memory of which deficiency has been compensated, in a window size. This achieves an efficient data transfer.

FIG. 2 shows a structure of a reception-side apparatus in the above-described Patent Reference 2.

A reception-side apparatus 960 in the above Patent Reference 2 is connected to a transmission-side apparatus 970 via a network.

In addition, the reception-side apparatus 960 includes, for example, a central controlling unit 962 executing an application program, a main memory 963 storing data necessary to execute the program, a communications controlling unit 965 communicating in accordance with the TCP/IP, and a mode controlling unit 961 directing the central controlling unit 962 a mode switch.

The communications controlling unit 965 includes: a first receiving buffer memory 967 for storing data transmitted from the transmission-side apparatus 970 and received; and a communications protocol processing unit 966 for receiving the data from the transmission-side apparatus 970 as well as transmitting an ACK packet, and then storing the received data to the first receiving buffer memory 967.

In the case where available space of the first receiving buffer memory 967 is small, the mode controlling unit 961 directs the central controlling unit 962 to secure part of the region of the main memory 963 as a second receiving buffer memory 974.

Upon receiving the direction, the central controlling unit 962 secures the second receiving buffer memory 974, and then notifies the communications protocol processing unit 966 of the details of the direction. As a result, the communications protocol processing unit 966 adds a size of the second receiving buffer memory 974 to the available space of the first receiving buffer memory 967, and notifies the transmission-side apparatus 970 of the result of the addition as a window size.

This allows the reception-side apparatus 960 to: have an increased size of a receiving buffer memory for receiving the data transmitted from the transmission-side apparatus 970; and cause as large amount of data as possible within the RTT to be transmitted to receive from the transmission-side apparatus 970.

Patent Reference 1: Japanese Unexamined Patent Application Publication No. 09-247209.

Patent Reference 2: Japanese Unexamined Patent Application Publication No. 2005-109765.

SUMMARY OF THE INVENTION

Problems that Invention is to Solve

The reception-side apparatuses (communications apparatuses) described in the above Patent References 1 and 2 have a problem of an environmental restriction in an efficient data transmission.

In other words, the reception-side apparatus 910 in the above Patent Reference 1 is a subject to a restriction that the transmission-side apparatus 920 is required to have a function to increase the window size for an efficient data transfer.

Further, the reception-side apparatus 960 in the above Patent Reference 2 is subject to a restriction that the main memory 963 is required to have an allocatable region as a receiving buffer memory for an efficient data transfer. In other words, data cannot be transferred efficiently under an environment in which the reception-side apparatus lacks an enough receiving buffer memory to be secured.

Thus, the present invention is conceived in view of the above problems and has as an objective to provide a communications apparatus (reception-side apparatus) enabling an efficient data transfer without an environmental restriction.

Means to Solve the Problem

In order to achieve the above objective, a communications apparatus, in the present invention, notifies a communications counterpart apparatus connected via a network of data amount in a window size, and receives data as large as the window size, the data being transmitted from the communications counterpart apparatus, The communications apparatus includes: a storing unit for storing the data transmitted from the communications counterpart apparatus; a size notifying unit notifying the communications counterpart apparatus of the window size larger than a capacity of the storing unit; a receiving unit receiving the data transmitted from the communications counterpart apparatus and store the received data in the storing unit, the data being transmitted according to the window size notified by the size notifying unit; and a processing unit retrieving and processing the data stored in the storing unit.

This causes, for example, an ACK packet to notify communications counterpart apparatus (transmission-side apparatus) of a window size larger than the capacity of the storing unit. Thus, a lot of data can be transmitted within the RTT from the communications counterpart apparatus to a storing unit (receiving buffer memory) even with a small capacity. Consequently, data can be efficiently transferred, freeing from an environmental restriction, such as a storing capacity. In other words, the reception-side apparatus 960 in the above Patent Reference 2 increases the capacity of the receiving buffer memory thereof by assigning part of the main memory 963 to be part of the receiving buffer memory, and notifies of the capacity in a window size. Meanwhile, the present invention enables an efficient data transfer without such assigning.

In other words, the present invention can notifies of a large window size even in an environment where a memory region, equivalent to the RWIN which suits the RTT, cannot be secured because a memory having a capacity of a dedicated storing unit or larger on each TPC connections cannot be secured. Thus, the present invention can notifies of a large window size even in an environment where a memory region, equivalent to the RWIN which suits the RTT, cannot be secured. As a result, the communications apparatus in the present invention can efficiently transfer data even in an environment where a memory region which suits the RTT cannot be secured unless processing by the processing unit is disrupted.

Moreover, the communications counterpart apparatus transmits the data as large as the window size in a plurality of data packets to be transmitted in order, the window size being notified of by the size notifying unit. The receiving unit sequentially receives and stores the plurality of the data packets in the storing unit. The communications apparatus further includes: a discarding unit securing available space in the storing unit by discarding a data packet included in the plurality of the data packets stored in the storing unit; and a retransmission requesting unit requesting the communications counterpart apparatus to retransmit the data packet discarded by the discarding unit. Here, the processing unit retrieves in a predetermined order the plurality of the data packets stored in said storing unit, and the discarding unit discards the data packet stored in said storing unit in the case where the retrieval of the data packets from said storing unit becomes disrupted, and thus the storing unit cannot afford a capacity to store a new data packet, the data packets being retrieved by said processing unit in the predetermined order.

For example, more packet losses occur as the window size of which the communications counterpart apparatus is notified becomes larger. When a packet loss occurs, the processing unit cannot retrieve data packets sequentially stored in the storing unit following the transfer of the lost data packet (lost packet). Thus, the available space of the storing unit may run out. In other words, reception processing is possibly disrupted. In such a case, even though the lost packet is retransmitted from the communications counterpart apparatus, the retransmitted lost packet cannot be stored in the storing unit since no available space is found in storing unit. Hence, a state of reception processing disruption continues, and data transfer processing which receives the data from the communications counterpart apparatus is possibly interrupted.

The present invention, meanwhile, can store the retransmitted lost packet as described above in the storing unit, and forward a lot of data packets stored in the storing unit to the processing unit since the data packets stored in the storing unit are discarded and available space is secured. Thus, interruption of the data transfer processing can be avoided. Moreover, since the discarded data packets are requested for retransmission, the discarded data packets can be received and stored in the storing unit again.

Consequently, a considerable decrease in data transfer efficiency can be avoided despite disruption of reception processing.

The retransmission requesting unit requests the communications counterpart apparatus to retransmit the discarded data packet by transnlitting as many negative acknowledgement packets as necessary for causing the discarded data packet to be retransmitted from the communications counterpart apparatus, each of the negative acknowledgment packets indicating the data packet discarded by the discarding unit.

When the communications counterpart apparatus has a communication function compatible with the Triple Duplicate ACK, for example, a Triple Duplicate ACK packet is transmitted to the communications counterpart apparatus as a negative acknowledgment packet. Thus, the discarded data packets can be quickly retransmitted to the communications counterpart apparatus. As a result, data packets equivalent to the notified window size can be quickly received, even when a packet loss occurs and the reception processing is disrupted.

Further, the discarding unit discards the data packets other than a last packet, so that a last data packet to be transmitted from the communications counterpart apparatus can be stored in the storing unit as the last packet, the last data packet being one of the data packets sequentially transmitted in accordance with the window size of which the size notifying unit has notified. Here, the retransmission requesting unit requests the communications counterpart apparatus to collectively retransmit a plurality of data packets transmitted between another data packet and the last packet by transmitting to the communications counterpart apparatus an acknowledging packet indicating the other data packet and the last packet stored in the storing unit.

When the communications counterpart apparatus has a communication function compatible with the Selective ACK, for example, a Selective ACK packet is transmitted to the communications counterpart apparatus as an acknowledgment packet. Thus, the discarded plural data packets can be collectively retransmitted to the communications counterpart apparatus. As a result, data packets equivalent to the notified window size can be quickly received, even when a packet loss occurs and the reception processing is disrupted. Moreover, the Selective ACK packet can facilitate to specify a data packet to be requested for retransmission by discarding the other data packets in order for the last packet to be left.

It is noted that the present invention can be implemented as a method and a program of the communications apparatus establishing a communication, a storing medium to store the program, and an integrated circuit to realize the communications apparatus, as well as the communications apparatus described above.

Effects of the Invention

A communication apparatus of the present invention has an advantageous effect to allow data to be transferred efficiently without an environmental restriction. In other words, the communications apparatus of the present invention can achieve a communication, using a large window size, even under an environment in which a memory region as large as RWIN to suit the RTT cannot be secured because the communications apparatus cannot secure a memory having an equivalent capacity or more than a receiving buffer memory dedicated to each of TCP connections. Hence, an efficient data transfer is possible. Further, the communications apparatus of the present invention can continue the data transfer without significant decline in efficiency by repeating discarding and requesting retransmission of a packet even in the case where processing of a packet within a receiving buffer memory of the communications apparatus (reception-side apparatus) is temporality disrupted.

BRIEF DESCRIPTION OF DRAWINGS

FIG. 18 illustrates an appearance structure of the reception-side apparatus and the transmission-side apparatus of the embodiment of the present invention.

NUMERICAL REFERENCES

Figure 1:
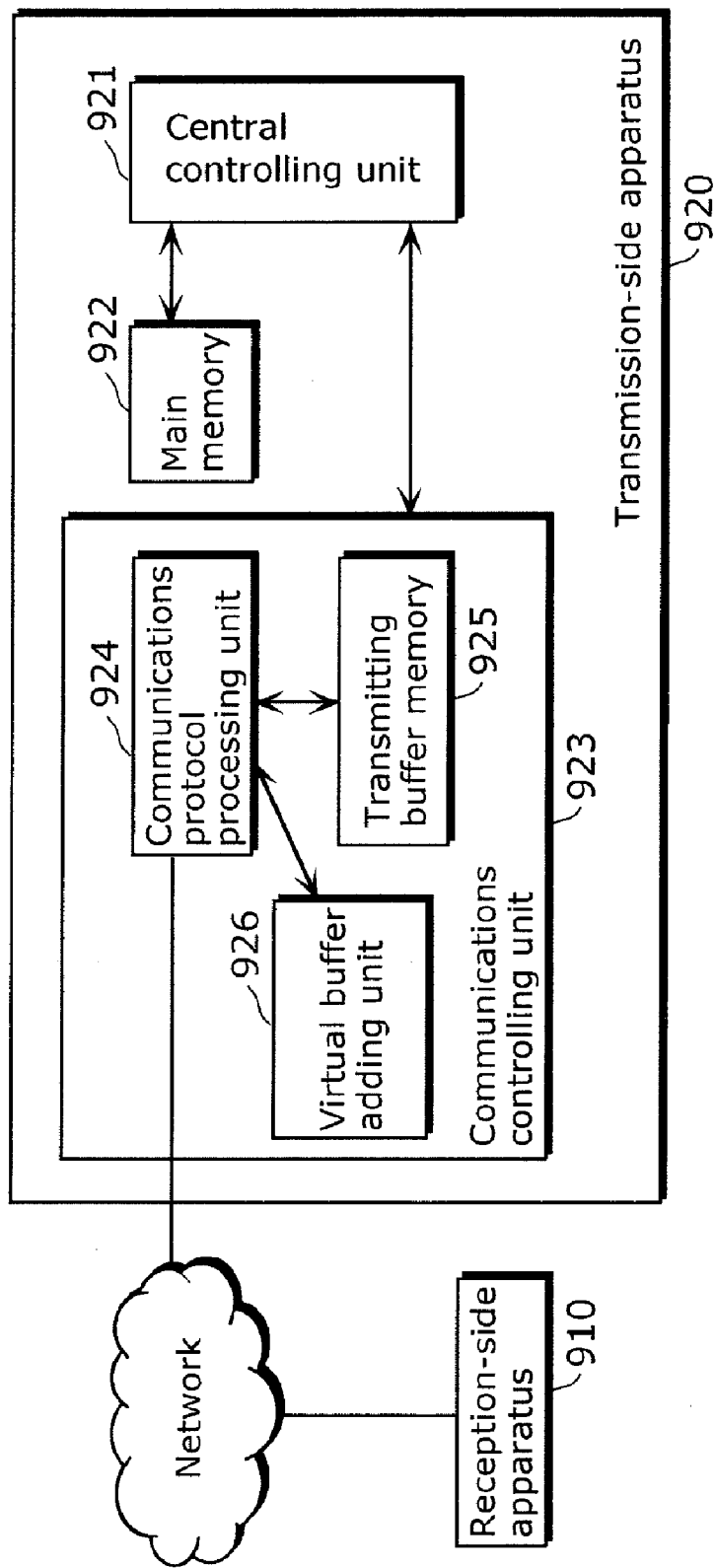
FIG. 1 is a block diagram of a transmission-side apparatus in Patent Reference 1.
Figure 2:
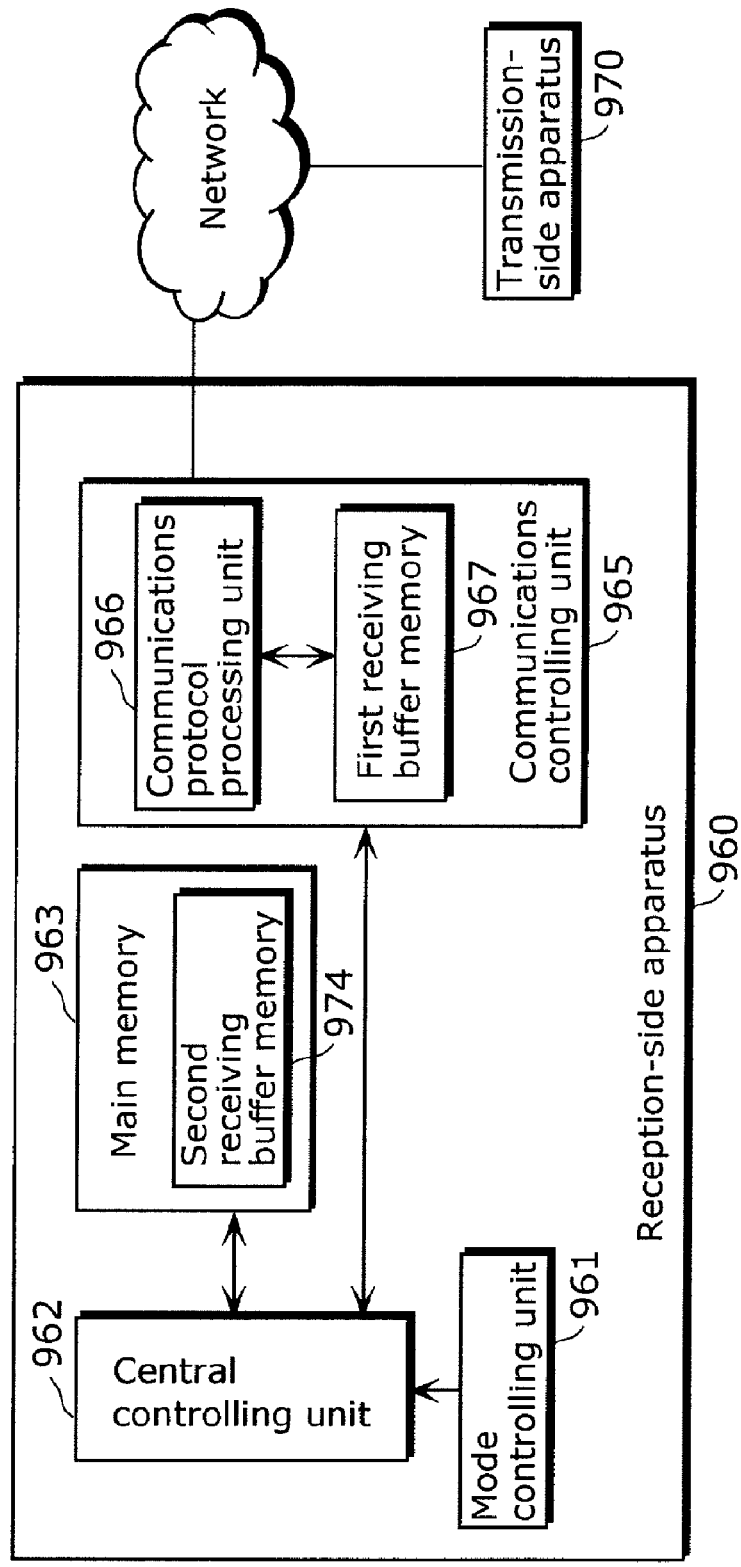
FIG. 2 is a block diagram of a reception-side apparatus in Patent Reference 2.

100 Reception-side apparatus (communications apparatus)
110 Communications controlling unit
120 Receiving buffer memory
130 Communications protocol processing unit
131 Transmission and reception controlling unit
132 ACK generating unit
133 Window size setting unit
134 Packet discarding unit
135 Retransmission requesting unit
140 Central controlling unit
150 Main memory
200 Transmission-side apparatus
300 Network

DETAILED DESCRIPTION OF THE INVENTION

With reference to the drawings, a reception-side apparatus (communications apparatus) in an embodiment of the present invention shall be described below.

Here, in order to simplify an explanation, a data length stored in one packet (LEN) is represented as 1 Kbyte. Further, a data size with one sequence number (SEQ) assigned is also represented as 1 Kbyte (1 packet), and a unit of a window size (RWIN) is also represented as 1 Kbyte.

Figure 3:
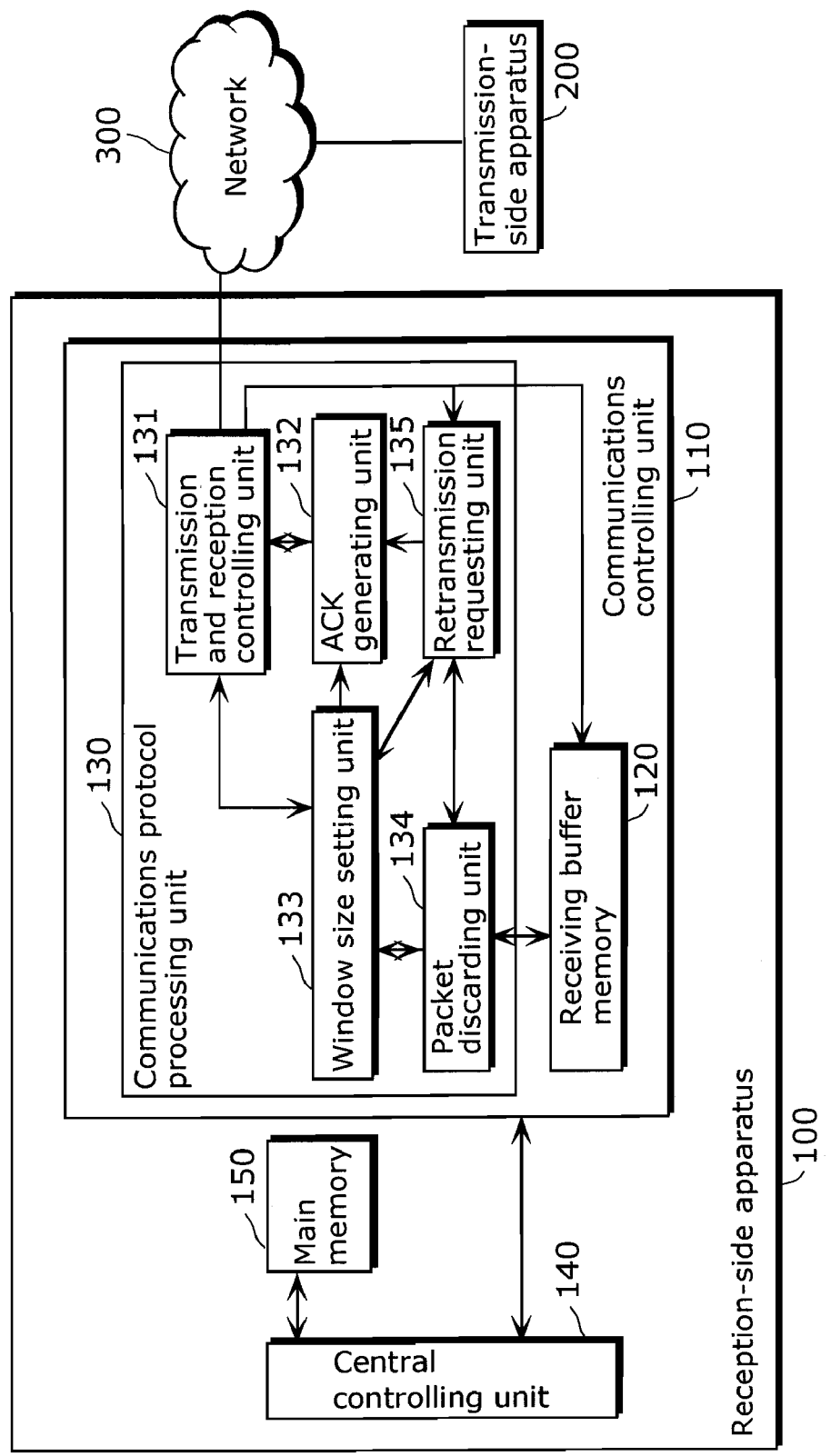
FIG. 3 is a block diagram exemplifying a structure of a reception-side apparatus in an embodiment of the present invention.

FIG. 3 exemplifies a structure of the reception-side apparatus in the embodiment of the present invention.

A reception-side apparatus (communications apparatus) 100 in the embodiment is connected to a transmission-side apparatus 200 via a network 300, and establishes a communication with the transmission-side apparatus 200 in accordance with the TCP/IP.

Here, the reception-side apparatus 100 and the transmission-side apparatus 200; namely communications apparatuses connected to the network 300 via on wire or by air, include a personal computer having an Ethernet (registered trademark) interface and a home appliance apparatus capable of network communications. The network 300 is a communications network including a wired or wireless connection, an example of which includes a public communications network such as the Internet. It is noted that the reception-side apparatus 100 and the transmission-side apparatus 200 may establish a communication, using an electric power line as a communication line.

The reception-side apparatus 100, including a communications controlling unit 110, a main memory 150, and a central controlling unit 140, receives data transmitted from the transmission-side apparatus 200

The central controlling unit 140 controls the communications controlling unit 110 and the main memory 150, and executes, for example, an application program, using the data transmitted from the transmission-side apparatus 200. It is noted in the embodiment that the central controlling unit 140 is configured as a processing unit to retrieve and process data stored in an after-described receiving buffer memory 120 of the communications controlling unit 110.

The main memory 150 includes a region to store necessary data for the processing in the central controlling unit 140.

The communications controlling unit 110 includes: a communications protocol processing unit 130 causing the transmission-side apparatus 200 to transmit the data, and then receiving the data; and the receiving buffer memory 120 for storing the data received by the communications protocol processing unit 130.

The communications protocol processing unit 130 includes a transmission and reception controlling unit 131, an ACK generating unit 132, a window size setting unit 133, a packet discarding unit 134, and a retransmission requesting unit 135.

The transmission and reception controlling unit 131 receives data, on a packet basis, transmitted from the transmission-side apparatus 200 (referred to as a data packet, hereinafter), and stores the data in the receiving buffer memory 120. Further, when receiving the data packet from the transmission-side apparatus 200 and storing the data packet in the receiving buffer memory 120, for example, the transmission and reception controlling unit 131 encourages the ACK generating unit 132 to generate an ACK packet, and transmits the generated ACK packet to the transmission-side apparatus 200.

In addition, the transmission and reception controlling unit 131 detects an occurrence of a packet loss by monitoring a sequence number of the received data packet transmitted from the transmission-side apparatus 200 in accordance with the ACK packet. For example, the transmission and reception controlling unit 131 transmits ACK packets. Based on the ACK packets, the transmission and reception controlling unit 131 judges weather or not there is a missing number out of the received sequence numbers of received data packets sequentially transmitted from the transmission-side apparatus 200. Then, when a missing number is found, the transmission and reception controlling unit 131 judges that a data packet corresponding to the missing number is lost in the network 300 and not received, and detects re of the packet loss. It is noted that the missing data packet as described above is hereinafter referred to as a lost packet.

Further, when detecting the occurrence of the packet loss, the transmission and reception controlling unit 131 notifies the window size setting unit 133 of the occurrence. In addition, when all of data packets corresponding to the above ACK packets are received after the occurrence of the packet loss, the transmission and reception controlling unit 131 judges that return processing for the packet loss has completed, and notifies the window size setting unit 133 of the completion of the return processing.

The ACK generating unit 132 generates an ACK packet indicating an ACK number and the window size (RWIN) set by the window size setting unit 133, and provides the ACK packet to the transmission and reception controlling unit 131.

Here, when the retransmission requesting unit 135 requests retransmission (retransmission request), the ACK generating unit 132 generates the ACK packet, and causes the transmission and reception controlling unit 131 to transmit the ACK packet to the transmission-side apparatus 200. In addition, when the data packet is received by the transmission and reception controlling unit 131 and stored in the receiving buffer memory 120 other than the transmission request (when responding to reception), the ACK generating unit 132 generates an ACK packet, and causes the transmission and reception controlling unit 131 to transmit the ACK packet to the transmission-side apparatus 200.

Meanwhile, when responding to reception, the ACK generating unit 132 typically generates an ACK packet indicating an ACK number identical to a sequence number following the sequence number of the data packet as an acknowledgment packet. When the occurrence of the packet loss is detected by the transmission and reception controlling unit 131, the ACK generating unit 132 generates an ACK packet indicating an ACK number identical to a sequence number of the missing data packet (lost packet) as a negative acknowledgement packet.

Further, at the retransmission request, the ACK generating unit 132 generates an ACK packet having an ACK number indicated by the retransmission requesting unit 135.

In other words, when the transmission-side apparatus 200 includes a communication function compatible with the Triple Duplicate ACK (referred to as TDACK, hereinafter), the ACK generating unit 132 generates three ACK packets indicating an identical ACK number (negative acknowledgement packets). It is noted that the above three packets are hereinafter referred to as Triple Duplicate ACK packets or TDACK packets. Moreover, when the transmission-side apparatus 200 includes a communication function compatible with the Selective ACK (referred to as: SACK, hereinafter), the ACK generating unit 132 generates an ACK packet including several ACK numbers identical to sequence numbers of several data packets stored in the receiving buffer memory 120 as an acknowledgement packet.

It is noted that when receiving the ACK packet at responding to reception, the transmission-side apparatus 200, in accordance with the TCP/IP, transmits a data packet equivalent to a window size indicated by the ACK packet without receiving another ACK packet after the reception of the ACK packet. Here, in addition, the transmission-side apparatus 200 transmits a data packet with a sequence number identical to an ACK number indicated by the received ACK packet assigned, and data packets with consecutive sequence numbers following the sequence number assigned.

Further, when receiving the TDACK packet (negative acknowledgment packet), the transmission-side apparatus 200 having the communication function compatible with the TDACK retransmits (high-speed retransmits) a data packet with a sequence number identical to an ACK number indicated by the TDACK packet assigned even though the data packet has already been transmitted.

Moreover, when receiving the SACK packet, the transmission-side apparatus 200 having the communication function compatible with the SACK specifies sequence numbers of several data packets stored in the receiving buffer memory 120, using several ACK numbers indicated by the SACK packet. In other words, despite the transmission of the data packet to the reception-side apparatus 100, the transmission-side apparatus 200 specifies one or more sequence numbers of one or more data packets which have not been stored in the receiving buffer memory 120. Then, the transmission-side apparatus 200 collectively retransmits (high-speed retransmits) the data packets which have not stored in the receiving buffer memory 120.

The window size setting unit 133 sets a data amount, which is typically independent from a capacity of the receiving buffer memory 120 and beyond reception when temporal disruption occurs in packet processing, in a window size.

In other words, the window size setting unit 133 in the embodiment sets a larger size than a memory capacity (available space) of the receiving buffer memory 120 as a window size. Hereinafter, this setting is referred to as a high-rate transfer setting. It is noted that the window size is set in accordance with a transfer rate of data which the reception-side apparatus 100 intends to receive. For example the window size setting unit 133 sets, as the window size, a size of data to be transferable from the receiving buffer memory 120 to the central controlling unit 140 during the RTT.

Meanwhile, when notified by the transmission and reception controlling unit 131 of the occurrence of the packet loss, the window size setting unit 133 sets the available space of the receiving buffer memory 120 as a window size from the notification of the packet loss to the completion of return processing. In other words, the window size setting unit 133 monitors the available space of the receiving buffer memory 120 via the packet discarding unit 134, and sets the available space as the window size. Hereinafter, this setting is referred to as a regular transfer setting.

Here, the available space of the receiving buffer memory 120 possibly runs out due to the packet loss. In this case, even though receiving the data packet transmitted from the transmission-side apparatus 200, the transmission and reception controlling unit 131 cannot store the received data packet in the receiving buffer memory 120 unless the already stored data packet is discarded.

As described above, a state, in which a new data packet cannot be stored in the receiving buffer memory 120 unless an already stored data packet is discarded, is referred to as a congested state, hereinafter.

When the receiving buffer memory 120 is in the congested state as described above, the packet discarding unit 134 discards the data packet already stored in the receiving buffer memory 120 in order to end the state. packet discarding unit 134 sequence number, already stored in the receiving buffer memory 120 transmission and reception controlling unit 131 receiving buffer memory 120 receiving buffer memory 120

The retransmission requesting unit 135 requests the transmission-side apparatus 200 to retransmit the discarded packet. In other words, the retransmission requesting unit 135 encourages the ACK generating unit 132 to generate an ACK packet necessary for causing the transmission-side apparatus 200 to transmit discarded packet.

In the case where the transmission-side apparatus 200 has the communication function compatible with the TDACK, for example, the retransmission requesting unit 135 directs the ACK generating unit 132 to generate a TDACK packet indicating a sequence number of the discarded packet as an ACK number.

Moreover, in the case where the transmission-side apparatus 200 has the communication function compatible with the SACK, the retransmission requesting unit 135 notifies the ACK generating unit 132 of the sequence numbers of the several data packets stored in the receiving buffer memory 120, and directs the ACK generating unit 132 to generate SACK packets indicating those sequence numbers as corresponding ACK numbers. It is noted that when several data packets having consecutive sequence numbers are stored in the receiving buffer memory 120, the retransmission requesting unit 135 notifies the ACK generating unit 132 of the first and the last sequence numbers out of the consecutive sequence numbers.

When directing the ACK generating unit 132 to generate the ACK packet, the retransmission requesting unit 135 encourages the window size setting unit 133 to set the window size.

It is noted in the embodiment that the receiving buffer memory 120 is configured as a storing unit for storing the data transmitted from the transmission-side apparatus 200 (communications counterpart apparatus). In addition, the window size setting unit 133, the ACK generating unit 132, and the transmission and reception controlling unit 131 are configured into a size notifying unit, and the transmission and reception controlling unit 131 as a receiving unit. Further, the packet discarding unit 134 is configured as a discarding unit, and the retransmission requesting unit 135 as a retransmission requesting unit.

Figure 4:
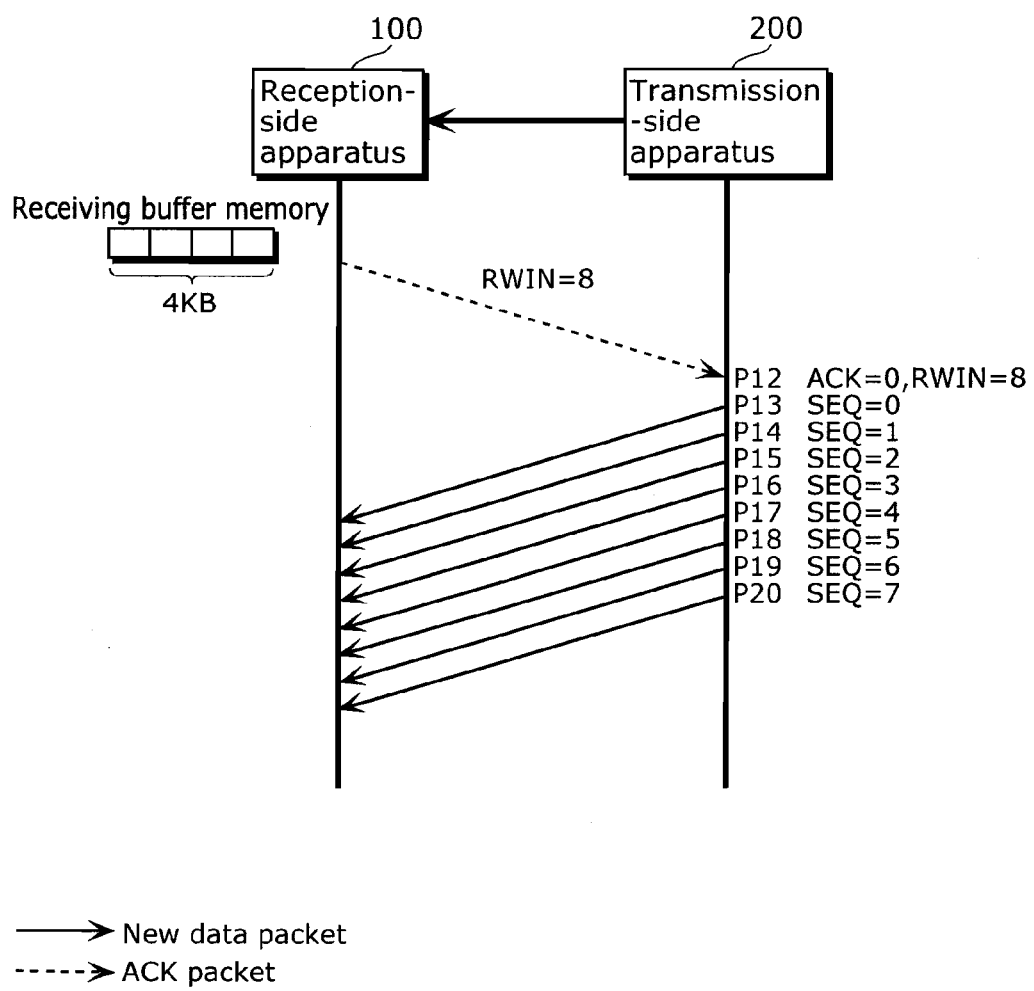
FIG. 4 is a sequence diagram illustrating a communication between the reception-side apparatus and a transmission-side apparatus in the embodiment of the present invention.

FIG. 4 is a sequence diagram illustrating communications between the reception-side apparatus 100 and the transmission-side apparatus 200.

First, the reception-side apparatus 100 and the transmission-side apparatus 200 establish a connection for providing a TCP connection, using the Three Way Handshake, for example.

Then, the window size setting unit 133 in the reception-side apparatus 100 sets the above-described high-rate transfer. In other words, the window size setting unit 133 sets a window size as large as 8 KB (RWIN=8), for example, even though the capacity of the receiving buffer memory 120 is as small as 4 KB. As a result, the ACK generating unit 132 generates an ACK packet P12 indicating RWIN=8. It is noted here that the ACK generating unit 132 generates the ACK packet P12 indicating the ACK number to be 0 (ACK=0).

When the ACK packet P12 is generated as described above, the transmission and reception controlling unit 131 of the reception-side apparatus 100 transmits the ACK packet P12 to the transmission-side apparatus 200 as an acknowledgement packet. In other words, the ACK packet P12 notifies the transmission-side apparatus 200 of the 8 KB window size.

When receiving the ACK packet P12, the transmission-side apparatus 200 transmits data packets P13, P14, ..., and P20 for a window size as that the ACK packet P12 indicates (RWIN=8). Here, the transmission-side apparatus 200 sequentially transmits each of the data packets P13, P14, ..., and P20, starting at the data packet P13 with a sequence number (SEQ=0) identical to an ACK number (ACK=0) which the ACK packet P12 shows assigned.

When sequentially receiving the data packets P13, P14, ..., and P20 from the transmission-side apparatus 200, the transmission and reception controlling unit 131 of the reception-side apparatus 100 sequentially stores the data packets in the receiving buffer memory 120.

The central controlling unit 140 of the reception-side apparatus 100 sequentially retrieves the data packets stored in the receiving buffer memory 120, and performs a process, using the data packets.

Here, the total size of the data packets P13, P14 ..., and P20 transmitted from the transmission-side apparatus 200 is as large as the window size which the ACK packet P12 indicates (8 KB); meanwhile, the capacity of the receiving buffer memory 120 is as small as 4 KB. As described above, however, the central controlling unit 140 sequentially retrieves the data packets stored in the receiving buffer memory 120, and forwards the data packets to the application program. Hence, all of the transmitted data packets P13, P14, ..., and P20 are normally received.

Further, the transmission and reception controlling unit 131 of the reception-side apparatus 100 repeatedly transmits ACK packets indicating RWIN=8, such as the ACK packet P12, and receives data packets as great as 8 KB from the transmission-side apparatus 200 in every RTT.

In the embodiment, the data can be transferred at a rate in accordance with a virtual window size larger than the capacity of the receiving buffer memory 120, instead of the rate in accordance with the capacity of the receiving buffer memory 120, as described above. As a result, improvement in a communication speed is expected. When the transmission-side apparatus 200 is notified of a window size twice as great (8 KB) as an actual capacity of receiving buffer memory 120 (4 KB), as described above, for example, a data transfer at twice as fast a communication speed as the communication speed at the 4 KB-window size can be achieved under an environment in which no packet loss occurs.

It is noted in the high-rate transfer setting of the embodiment that the window size is set twice as large as the capacity of the receiving buffer memory 120; meanwhile, the window size can be set to any given size. Preferably, the window size is to be set as large as possible unless the packet loss occurs.

Here, simply setting, by the window size setting unit 133, a larger window size than the capacity of the receiving buffer memory 120 possibly stops the data transfer between the reception-side apparatus 100 and the transmission-side apparatus 200 when the packet loss occurs.

Figure 5:
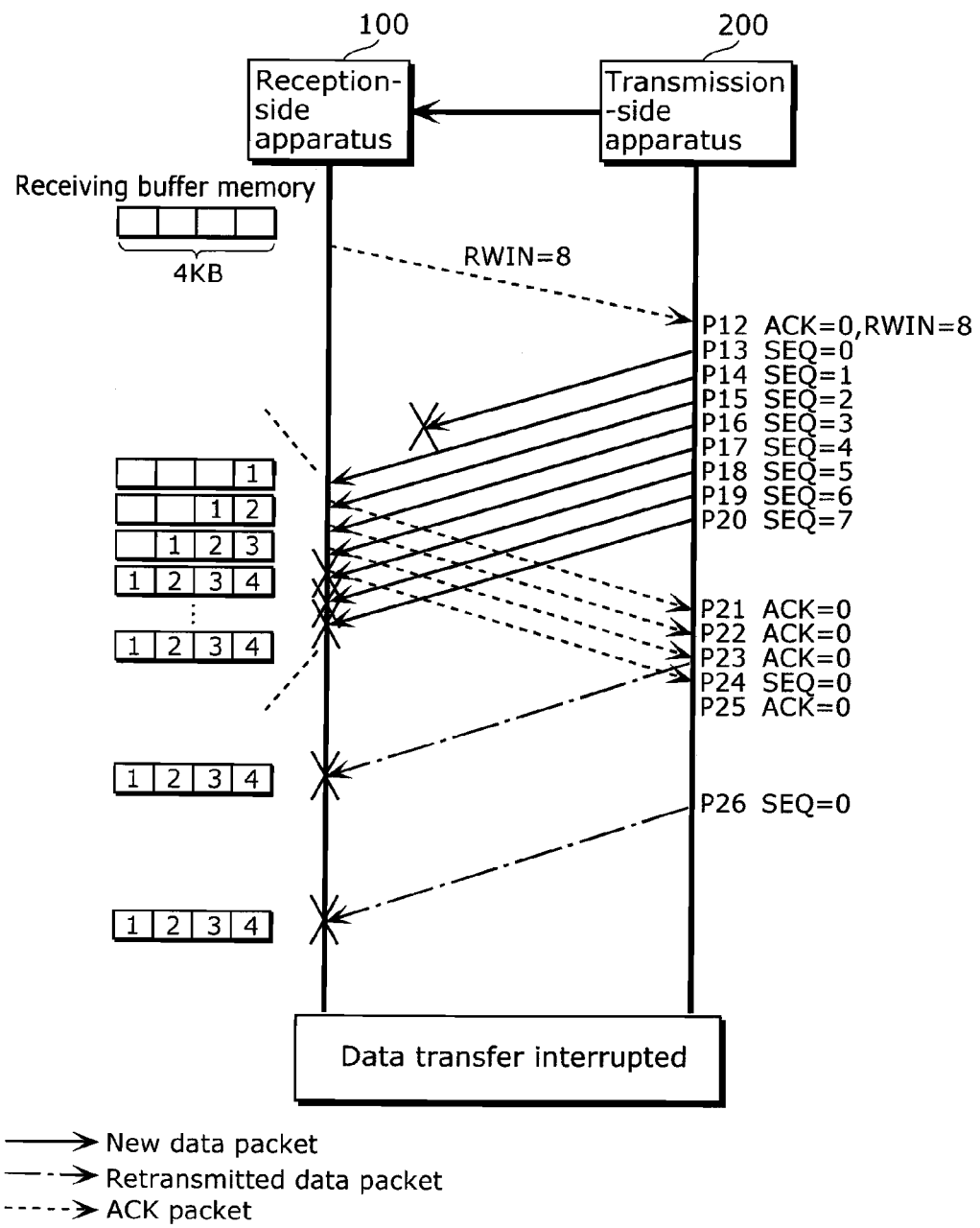
FIG. 5 is a sequence diagram showing an interruption of a data transfer due to a packet loss.

FIG. 5 is a sequence diagram showing an interruption of a data transfer due to the packet loss.

Out of the data packets P13, P14, ..., P20 transmitted from the transmission-side apparatus 200 in response to the ACK packet P12, for example, the data packet P13 is lost in the network 300. In other words, the packet loss has occurred.

Here, when the data packets P14, P15, P16, and P17 are sequentially received by a reception-side apparatus, the data packets are sequentially stored in the receiving buffer memory of the reception-side apparatus, and available space of the receiving buffer memory runs out. In other words, the receiving buffer memory of the reception-side apparatus is in the above-described congested state.

It is noted that in FIG. 5, data packets stored in the receiving buffer memory are represented with sequence numbers assigned to the data packets.

Here, a sequence control is executed in the TCP. Thus, each of the data packets is delivered in an ascending order of the sequence numbers from the receiving buffer memory to the central controlling unit (application program). Hence, when a packet loss occurs as described above, the data packets cannot be delivered to the central controlling unit even though the data packets P14, P15, P16, and P17 (SEQ=1, 2, 3, 4) have been stored in the receiving buffer memory since the data packet P13 (SEQ=0) has not been stored in the receiving buffer memory.

As a result, even though received by the reception-side apparatus in order, the data packets P18, P19, and P20 are not stored in the receiving buffer memory but are discarded since no available space is found in the receiving buffer memory.

Further, as described above, when receiving the data packets P14, P15, P16, and P17 in order, the reception-side apparatus transmits to the transmission-side apparatus 200 ACK packets (negative acknowledgement packet) P21, P22, P23, and P25 indicating the ACK numbers to be 0 (ACK=0) upon receiving each of the data packets.

Here, in the case where the transmission-side apparatus 200 has the communication function compatible with the TDACK, the transmission-side apparatus 200 retransmits a data packet P24 having a sequence number 0 as a lost packet upon receiving three ACK packets indicating ACK=0; namely P21, P22, and P23, as TDACK packets.

However, no available space is found in the receiving buffer memory as described above when the data packet P24 is retransmitted. Thus, the data packet P24 is not stored in the receiving buffer memory but is discarded.

Further, when a data packet P26 having a sequence number 0 is retransmitted, as well, the data packet P26 is not stored in the receiving buffer memory but is discarded, as described above.

As a result, the data transfer from the transmission-side apparatus 200 to the reception-side apparatus is interrupted.

Hence, in order to prevent the suspension of the data transfer described above, the reception-side apparatus 100 in the embodiment discards the data packets, in a congested state, stored in the receiving buffer memory 120, and requests the transmission-side apparatus 200 to retransmit the discarded data packets.

Figure 6:
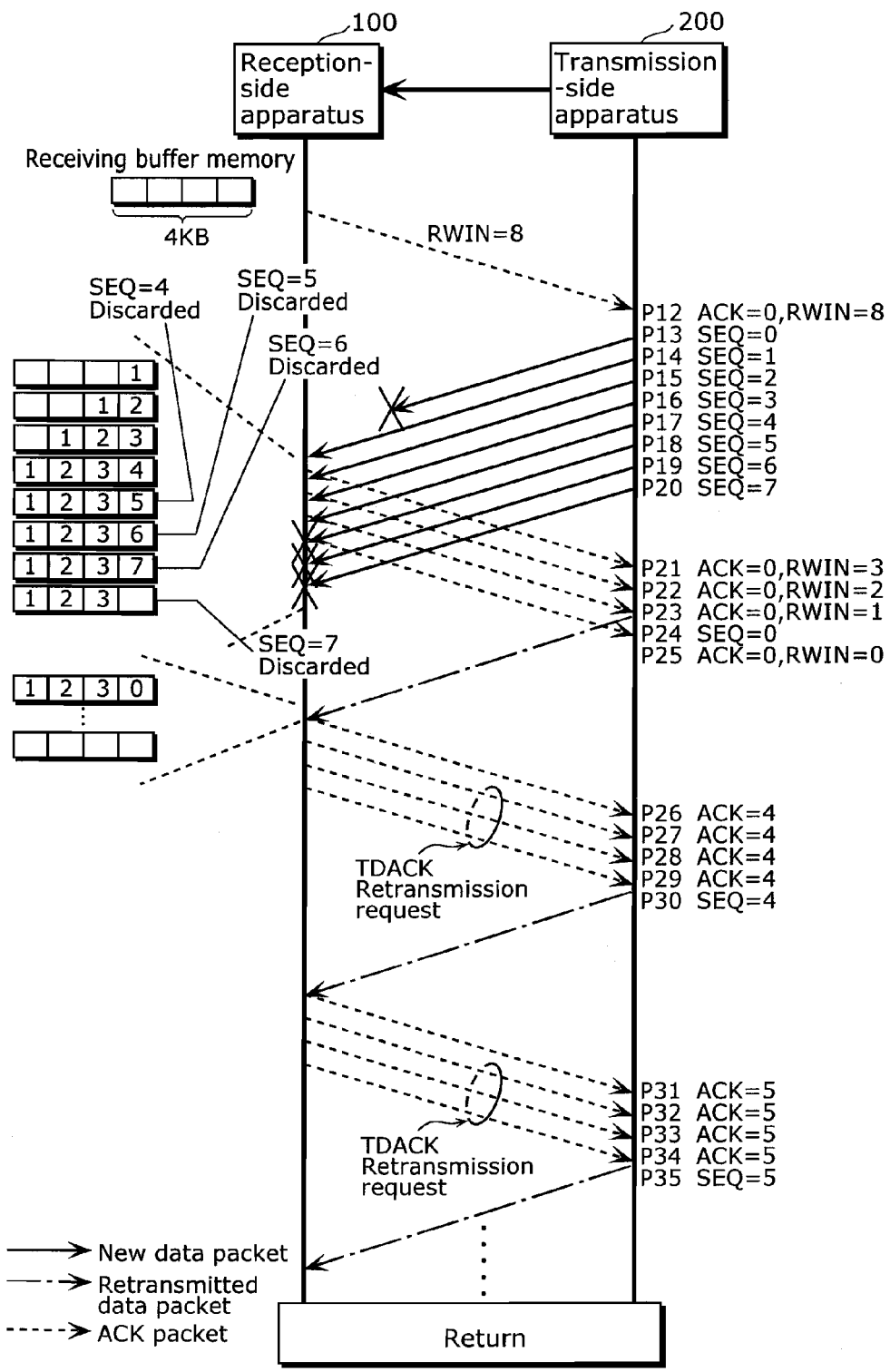
FIG. 6 is a sequence diagram exemplifying a communication between the reception-side apparatus and a transmission-side apparatus compatible with the TDACK in the embodiment of the present invention when a packet loss occurs.

FIG. 6 is a sequence diagram exemplifying a communication between the reception-side apparatus 100 and the transmission-side apparatus 200 compatible with the TDACK when a packet loss occurs.

First, the reception-side apparatus 100 and the transmission-side apparatus 200 establish a connection for providing a TCP connection, using the Three Way Handshake, for example. Here, the transmission and reception controlling unit 131 in the reception-side apparatus 100 specifies a communication function of the transmission-side apparatus 200. For example, the transmission and reception controlling unit 131 judges that the communication function of the transmission-side apparatus 200 is compatible with the TDACK. As a result, the reception-side apparatus 100 requests retransmission compatible with the TDACK from the transmission-side apparatus 200 when a packet loss occurs.

Specifically, first, the window size setting unit 133 of the reception-side apparatus 100 sets a high-rate transfer, as described above. In other words, the window size setting unit 133 sets a window size as large as 8 KB (RWIN=8), for example, even though the capacity of the receiving buffer memory 120 is as small as 4 KB. As a result, the ACK generating unit 132 generates the ACK packet P12 indicating ACK=0 and RWIN=8.

When the ACK packet P12 is generated as described above, the transmission and reception controlling unit 131 of the reception-side apparatus 100 transmits the ACK packet P12 to the transmission-side apparatus 200 as an acknowledgement packet.

When receiving the ACK packet P12, the transmission-side apparatus 200 transmits data packets P13, P14 . . . , and P20 which are as large a window size as that the ACK packet P12 indicates (RWIN=8).

Here, out of the data packets P13, P14, . . . , and P20 transmitted from the transmission-side apparatus 200 in response to the ACK packet P12, the data packet P13 disappears in the network 300. In other words, a packet loss occurs.

When receiving the data packet P14 (SEQ=1), the transmission and reception controlling unit 131 of the reception-side apparatus 100 detects the fact that a data packet having the sequence number 0 (lost packet) has disappeared; that is a packet loss has occurred, since the transmission and reception controlling unit 131 does not receive the data packet having the sequence number 0. Further, the transmission and reception controlling unit 131 notifies the ACK generating unit 132 of the sequence number 0 of the lost packet.

Moreover, receiving the data packets P14, P15, P16, and P17 in order, the transmission and reception controlling unit 131 sequentially stores those data packets (SEQ=1, 2, 3, and 4) in the receiving buffer memory 120. However, since the data packet P13 having the sequence number 0 has not been stored in the receiving buffer memory 120, the data packets P14, P15, P16 and P17 cannot be transmitted to the central controlling unit 140. Thus, available space of the receiving buffer memory 120 runs out. In other words, the receiving buffer memory 120 is in a congested state here.

Hence, the packet discarding unit 134 discards the data packet P17 having sequence number 4, and notifies the retransmission requesting unit 135 of the sequence number 4 of the discarded packet. As a result, the receiving buffer memory 120 is temporality out of the congested state, and obtains available space. Thus, the receiving buffer memory 120 is ready to store a new data packet.

This causes the transmission and reception controlling unit 131 to store the received data packet P18 (SEQ=5), transmitted from the transmission-side apparatus 200, in the receiving buffer memory 120.

When the data packet P18 (SEQ=5) is stored in the receiving buffer memory 120, the receiving buffer memory 120 stores the data packets P14, P15, P16, and P18 (SEQ=1, 2, 3, and 5), which results in the congested state again.

Hence, the packet discarding unit 135 discards the data packet P18 having the sequence number 5, and notifies the retransmission requesting unit 135 of the sequence number 5 of the discarded packet. As a result, the receiving buffer memory 120 is temporality out of the congested state, and obtains available space. Thus, the receiving buffer memory 120 is ready to store a new data packet.

This causes the transmission and reception controlling unit 131 to store the received data packet P19 (SEQ=6), transmitted from the transmission-side apparatus 200, in the receiving buffer memory 120.

Storing and discarding the data packets described above are repeated until a data packet having the sequence number 7 (last packet) is received by the reception-side apparatus 100. As a result, the data packet P20 (SEQ=7) stored in the receiving buffer memory 120 is deleted, and the receiving buffer memory 120 obtains available space to be ready to store a new data packet.

It is noted in the embodiment that the data packets stored in the receiving buffer memory 120 are discarded every time the receiving buffer memory 120 is in the congested state; meanwhile, the data packets may be discarded only after the last packet, the data packet P20, has arrived at the reception-side apparatus 100.

In this case, when the data packet P17 indicating SEQ=4 is stored in the receiving buffer memory 120, the receiving buffer memory 120 is in the congested state; however, the data packet P17 is not discarded as described above, and the congested state continues. As a result, even though the data packet P18 indicating SEQ=5 is received by the transmission and reception controlling unit 131, the transmission and reception controlling unit 131 cannot store the data packet P18 in the receiving buffer memory 120, and thus loses the data packet P18. Since the congested state continues after that, the transmission and reception controlling unit 131 loses the data packets P19 and P20 indicating SEQ=6 and 7, as described above, even though sequentially receiving the data packets.

After the last packet, the data packet P20, disappears, the packet discarding unit 134 discards the data packet P17 (SEQ=4), having the largest sequence number, stored in the receiving buffer memory 120 in the congested state. As a result, the receiving buffer memory 120 obtains available space, and is ready to store a new data packet.

In such a case, the retransmission requesting unit 135 requests the transmission-side apparatus 200 to retransmit a data packet received by the transmission and reception controlling unit 131 but failed to be stored in the receiving buffer memory 120, as well as to retransmit the data packets discarded by the packet discarding unit 134.

Further, the transmission and reception controlling unit 131 may overwrite and discard the data packets stored in the receiving buffer memory 120.

In this case, when the data packet P17 indicating SEQ=4 is stored in the receiving buffer memory 120, the receiving buffer memory 120 is in the congested state. Here, when receiving the data packet P18 indicating SEQ=5, the transmission and reception controlling unit 131 discards the data packet P17 indicating SEQ=4 upon storing the data packet P18 in the receiving buffer memory 120 by overwriting the data packet P18 in the receiving buffer memory 120. After that, sequentially receiving the data packets P19 and P20 indicating SEQ=6 and 7, the transmission and reception controlling unit 131 overwrites the data packets in the receiving buffer memory 120 in order, and then discards the data packets P18 and P19 indicating SEQ=5 and 6 in order, as described above.

The packet discarding unit 134 discards only the last packet, the data packet P20, (SEQ=7) stored in the receiving buffer memory 120 in the congested state. As a result, the receiving buffer memory 120 obtains available space. Thus, the receiving buffer memory 120 is ready to store a new data packet.

In such a case, the retransmission requesting unit 135 requests the transmission-side apparatus 200 to retransmit the data packets discarded by the overwriting of the transmission and reception controlling unit 131, as well as to retransmit the data packets discarded by the packet discarding unit 134.

Now, when receiving the above described data packets P14, P15, P16, and P17, the reception-side apparatus 100 transmits on the reception basis ACK packets P21, P22, P23, and P25; namely negative acknowledgement packets each indicating ACK=0, to the transmission-side apparatus 200 since the data packets P14, P15, P16, and P17 have no sequence number 0.

In other words, when the transmission and reception controlling unit 131 detects a packet loss upon receiving the data packet P14 (SEQ=1), the window size setting unit 133 suspends the high-rate transfer setting and sets a regular transfer. As a result, the window size setting unit 133 sets available space of the receiving buffer memory 120 to the window size (RWIN=3).

Thus, when the transmission and reception controlling unit 131 receives the data packet P14 (SEQ=1), the ACK generating unit 132 generates the ACK packet (negative acknowledgement packet) P21 indicating ACK=0 and RWIN=3, and causes the ACK packet P21 to be transmitted from the transmission and reception controlling unit 131 to the transmission-side apparatus 200.

Further, when the transmission and reception controlling unit 131 receives the data packet P15 (SEQ=2), the window size setting unit 133 is set to a regular transfer. In other words, the window size setting unit 133 sets available space of the receiving buffer memory 120 to the window size (RWIN=2).

Thus, when the transmission and reception controlling unit 131 receives the data packet P15 (SEQ=2), the ACK generating unit 132 generates the ACK packet (negative acknowledgement packet) P22 indicating ACK=0 and RWIN=2, and causes the ACK packet P22 to be transmitted from the transmission and reception controlling unit 131 to the transmission-side apparatus 200.

Hence, the reception-side apparatus 100 transmits the ACK packet (ACK=0) to the transmission-side apparatus 200 every reception of the data packet until receiving the data packet P17.

Meanwhile, when receiving the ACK packets P21, P22, and P23 each indicating ACK=0, the transmission-side apparatus 200 retransmits the data packet P24 indicating the sequence number 0 (lost packet) to the reception-side apparatus 100 since the transmission-side apparatus 200 has the communication function compatible with the TDACK.

When receiving the retransmitted data packet P24, the transmission and reception controlling unit 131 of the reception-side apparatus 100 stores the data packet P24 in the receiving buffer memory 120.

As a result, data packets indicating associated sequence numbers 0, 1, 2, and 3 are stored in the receiving buffer memory 120. Thus, the data packets are quickly forwarded to the central controlling unit 140.

Here, when the retransmitted lost packets are received and stored in the receiving buffer memory 120, the retransmission requesting unit 135 of the reception-side apparatus 100 requests the transmission-side apparatus 200 to retransmit the discarded packets discarded by the packet discarding unit 134.

Specifically, the retransmission requesting unit 135 encourages the ACK generating unit 132 to generate four ACK packets indicating an identical ACK number (ACK=4) to the smallest sequence number 4, for example, out of sequence numbers 4, 5, 6, and 7 of the discarded packets of which the packet discarding unit 134 notifies.

As a result, the ACK generating unit 132 generates four ACK packets (negative acknowledgement packets) P26, P27, P28, and P29 each indicating ACK=4, and causes the ACK packets to be transmitted from the transmission and reception controlling unit 131 to the transmission-side apparatus 200. Here, it is noted that the window size setting unit 133 sets RWIN=4 as the window size, for example. Thus, the above described each of the ACK packets to be transmitted indicates RWIN=4. Moreover, the ACK packets P27, P28, and P29 are transmitted as the TDACK.

Meanwhile, receiving the above described four ACK packets P26, P27, P28, and P29, the transmission-side apparatus 200 transmits a data packet P30, having an identical sequence number to the ACK number 4 indicated by the ACK packets (SEQ=4), to the reception-side apparatus 100. In other words, a discarded packet (data packet P30) is retransmitted at a high rate.

When receiving the data packet P30, the transmission and reception controlling unit 131 of the reception-side apparatus 100 stores the data packet P30 in the receiving buffer memory 120. As a result, the discarded packet having the sequence number 4 is stored again in the receiving buffer memory 120 as the data packet P30, and forwarded to the central controlling unit 140.

Here, the retransmission requesting unit 135 further encourages the ACK generating unit 132 to generate four ACK packets indicating an identical ACK number to the second smallest sequence number 5 (ACK=5) out of the sequence numbers 4, 5, 6, and 7 of the discarded packets of which the packet discarding unit 134 notifies.

As a result, the ACK generating unit 132 generates four ACK packets (negative acknowledgement packets) P31, P32, P33, and P34 each indicating ACK=5, and causes the ACK packets to be transmitted from the transmission and reception controlling unit 131 to the transmission-side apparatus 200. Here, it is noted that the window size setting unit 133 sets RWIN=4 as the window size. Thus, the above described each of the ACK packets to be transmitted indicates RWIN=4. Moreover, the ACK packets P32, P33, and P34 are transmitted as the TDACK.

Receiving the above described four ACK packets P31, P32, P33, and P34, the transmission-side apparatus 200 transmits a data packet P35, having an identical sequence number to the ACK number 5 indicated by the ACK packets (SEQ=5), to the reception-side apparatus 100. In other words, a discarded packet (data packet P35) is retransmitted at a high rate.

When receiving the data packet P35, the transmission and reception controlling unit 131 of the reception-side apparatus 100 stores the data packet P35 in the receiving buffer memory 120. As a result, the discarded packet having the sequence number 5 is again stored in the receiving buffer memory 120 as the data packet P35, and forwarded to the central controlling unit 140.

Repetition of high-rate retransfers of a discarded packet as described above causes all the data packets, subject to transmission from the transmission-side apparatus 200 to the central controlling unit 140, to be forwarded to the central controlling unit 140 in response to the ACK packet P12 (ACK=0, RWIN=8); namely, an acknowledgement packet at the high-rate transfer setting.

As a result, the transmission and reception controlling unit 131 judges that return processing for the packet loss has completed, and notifies the window size setting unit 133 of the completion of the return processing. Upon receiving the notification, the window size setting unit 133 again sets to the high-rate transfer.

Figure 7:
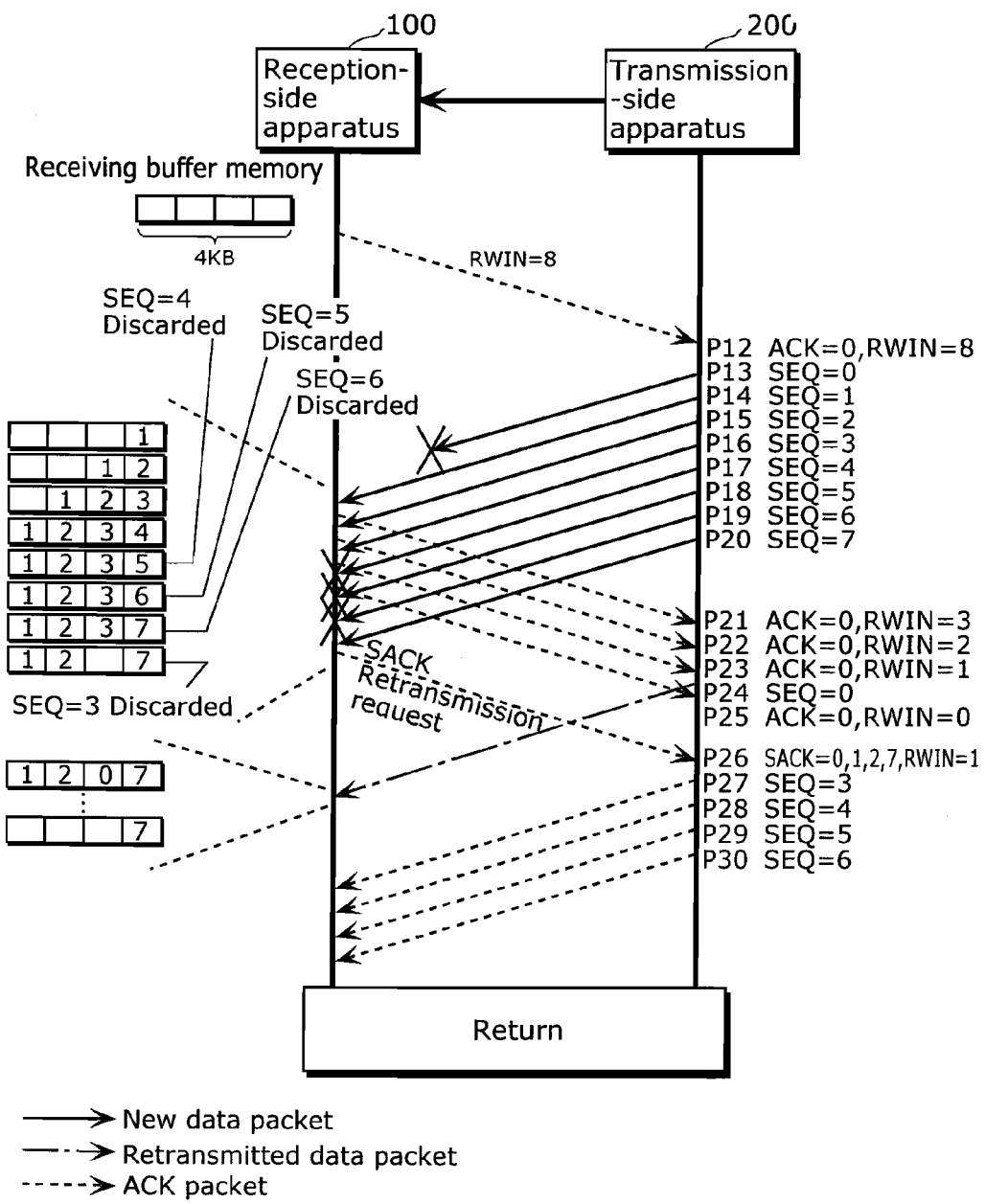
FIG. 7 is a sequence diagram exemplifying a communication between the reception-side apparatus and a transmission-side apparatus compatible with the SACK in the embodiment of the present invention when a packet loss occurs.

FIG. 7 is a sequence diagram exemplifying a communication between the reception-side apparatus 100 and the transmission-side apparatus 200 compatible with the SACK when a packet loss occurs.

First, the reception-side apparatus 100 and the transmission-side apparatus 200 establish a connection for providing a TCP connection, using the Three Way Handshake, for example. Here, the transmission and reception controlling unit 131 in the reception-side apparatus 100 specifies a communication function of the transmission-side apparatus 200. For example, the transmission and reception controlling unit 131 judges that the communication function of the transmission-side apparatus 200 is compatible with the SACK. As a result, the reception-side apparatus 100 requests retransmission compatible with the SACK from the transmission-side apparatus 200 when a packet loss occurs.

Specifically, first, the window size setting unit 133 of the reception-side apparatus 100 sets a high-rate transfer, as described above. In other words, the window size setting unit 133 sets a window size as large as 8 KB (RWIN=8), for example, even though the capacity of the receiving buffer memory 120 is as small as 4 KB. As a result, the ACK generating unit 132 generates the ACK packet P12 indicating ACK=0 and RWIN=8.

When the ACK packet P12 is generated as described above, the transmission and reception controlling unit 131 of the reception-side apparatus 100 transmits the ACK packet P12 to the transmission-side apparatus 200 as an acknowledgement packet.

When receiving the ACK packet P12, the transmission-side apparatus 200 transmits data packets P13, P14 . . . , and P20 which are as large a window size as that the ACK packet P12 indicates (RWIN=8), as described above.

Out of the data packets P13, P14, . . . , P20 transmitted from the transmission-side apparatus 200 in response to the ACK packet P12, for example, the data packet P13 is lost in the network 300. In other words, a packet loss has occurred.

When receiving the data packet P14 (SEQ=1), the transmission and reception controlling unit 131 of the reception-side apparatus 100 detects the fact that a data packet having a sequence number 0 (lost packet) has disappeared since the transmission and reception controlling unit 131 does not receive the data packet having the sequence number 0; that is, a packet loss has occurred. Further, the transmission and reception controlling unit 131 notifies the ACK generating unit 132 of the sequence number 0 of the lost packet.

Moreover, receiving the data packets P14, P15, P16, and P17 in order, the transmission and reception controlling unit 131 sequentially stores those data packets (SEQ=1, 2, 3, and 4) in the receiving buffer memory 120. However, since the data packet P13 having the sequence number 0 is not stored in the receiving buffer memory 120, the data packets P14, P15, P16 and P17 cannot be transmitted to the central controlling unit 140. Thus, available space of the receiving buffer memory 120 runs out. In other words, the receiving buffer memory 120 is in a congested state here.

Hence, the packet discarding unit 134 discards the data packet P17 having sequence number 4. As a result, the receiving buffer memory 120 is temporality out of the congested state, and obtains available space. Thus, the receiving buffer memory 120 is ready to store a new data packet.

This causes the transmission and reception controlling unit 131 to store the received data packet P18 (SEQ=5), transmitted from the transmission-side apparatus 200, in the receiving buffer memory 120.

When storing the data packet P18 (SEQ=5), the receiving buffer memory 120 stores the data packets P14, P15, P16, and P18 (SEQ=1, 2, 3, and 5), which results in the congested state again.

Hence, the packet discarding unit 134 discards the data packet P18 having sequence number 5. As a result, the receiving buffer memory 120 is temporality out of the congested state, and obtains available space. Thus, the receiving buffer memory 120 is ready to store a new data packet.

This causes the transmission and reception controlling unit 131 to store the received data packet P19 (SEQ=6), transmitted from the transmission-side apparatus 200, in the receiving buffer memory 120.

Storing and discarding the data packets described above are repeated until a data packet having the sequence number 7 (last packet) is received by the reception-side apparatus 100.

It is noted here that when the data packet P20, the last packet, is stored in the receiving buffer memory 120, and thus the receiving buffer memory 120 is in the congested state, the packet discarding unit 134 discards the data packet P16 having the sequence number 3 instead of the data packet P20; namely, the last packet.

In other words, when the receiving buffer memory 120 is in the congested state, the packet discarding unit 134 judges whether or not the data packet stored immediately before is the last packet. It is noted that the last packet is a data packet to be transferred last out of the data packets transmitted from the transmission-side apparatus 200 with respect to the ACK packet P12; namely, the acknowledgement packet at the high-rate transfer setting.

Then, judging the data packet P20 as the last packet, the packet discarding unit 134 discards the data packet P16 indicating SEQ=3 (inter-packet), instead of the data packet P20 indicating data SEQ=7, out of the data packets stored in the receiving buffer memory 120 in the congested state.

As a result, the packet discarding unit 134 discards the data packets P16, P17, P18, and P19 (SEQ=3, 4, 5, and 6).

As described above, when the packet discarding unit 134 leaves the last packet in the receiving buffer memory 120, instead of deleting the last packet, the retransmission requesting unit 135 encourages the ACK generating unit 132 to generate a SACK packet for collectively retransmitting a plurality of discarded packets which have not stored in the receiving buffer memory 120. For example, since the data packets P14, P15, and P20 indicating SEQ=1, 2, and 7 are stored in the receiving buffer memory 120, the retransmission requesting unit 135 notifies the transmission-side apparatus 200 of: the start and the last of consecutive sequence numbers; namely, SEQ=1, and 2; and a sequence number which is not sequenced to any sequence numbers; namely, SEQ=7. In other words, the SACK packet generated here can indicate the sequence numbers 3 to 6 between the sequence numbers 2 and 7 as sequence numbers of the data packets subject to retransmission by indicating the sequence numbers 1, 2, and 7, of the three data packets stored in the receiving buffer memory 120, as ACK numbers.

Further, receiving the above described data packets P14, P15, P16 and P17, the reception-side apparatus 100 transmits, by each reception, the ACK packets P21, P22, P23, and P25; namely negative acknowledgement packets each indicating ACK=0, to the transmission-side apparatus 200 since received data packets do not have the sequence number 0.

In other words, when the transmission and reception controlling unit 131 detects a packet loss upon receiving the data packet P14 (SEQ=1), the window size setting unit 133 suspends the high-rate transfer setting and sets to a regular transfer. As a result, the window size setting unit 133 sets available space of the receiving buffer memory 120 to the window size (RWIN=3).

Thus, when the transmission and reception controlling unit 131 receives the data packet P14 (SEQ=3), the ACK generating unit 132 generates the ACK packet (negative acknowledgement packet) P21 indicating ACK=0 and RWIN=3, and causes the ACK packet P21 to be transmitted from the transmission and reception controlling unit 131 to the transmission-side apparatus 200.

Further, when the transmission and reception controlling unit 131 receives the data packet P15 (SEQ=2) as well, the window size setting unit 133 is set to a regular transfer. In other words, the window size setting unit 133 sets available space of the receiving buffer memory 120 to the window size (RWIN=2).

Thus, when the transmission and reception controlling unit 131 receives the data packet P15 (SEQ=2), the ACK generating unit 132 generates the ACK packet (negative acknowledgement packet) P22 indicating ACK=0 and RWIN=2, and causes the ACK packet P22 to be transmitted from the transmission and reception controlling unit 131 to the transmission-side apparatus 200.

Hence, the reception-side apparatus 100 transmits the ACK packet (ACK=0) to the transmission-side apparatus 200 each reception of a data packet until receiving the data packet P17.

Here, when the data packet P20 having the sequence number 7; namely the last packet, is stored in the receiving buffer memory 120 and the data packet P16 having the sequence number 3 is discarded, the retransmission requesting unit 135 of the reception-side apparatus 100 requests the transmission-side apparatus 200 to retransmit the discarded packet discarded which the packet discarding unit 134 has discarded.

Specifically, the retransmission requesting unit 135 specifies sequence numbers of the data packets stored in the receiving buffer memory 120. In the above described case, the retransmission requesting unit 135 specifies the sequence numbers 1, 2, and 7 since the receiving buffer memory 120 stores the data packets P14, P15, and P20 (SEQ=1, 2, and 7). Then, the retransmission requesting unit 135 notifies the ACK generating unit 132 of the specified sequence numbers 1, 2, and 7, and directs the ACK generating unit 132 to generate SACK packets each indicating the associated sequence numbers as corresponding ACK numbers. In this example, out of the specified sequence numbers 1, 2, and 7 described above, consecutive sequence numbers are SEQ=1 and 2, and the start and the last of the sequence numbers are SEQ=1 and 2. Thus, the retransmission requesting unit 135 notifies the ACK generating unit 132 of all of the specified sequence numbers 1, 2, and 7.

As a result, the ACK generating unit 132 generates a SACK packet P26 indicating regular ACK=0 and ACK=1, 2 and 7 (the sequence numbers of the missing data packets; that is, 3 to 6), and causes the SACK packet P26 to be transmitted from the transmission and reception controlling unit 131 to the transmission-side apparatus 200. Here, it is noted that the window size setting unit 133 sets RWIN=1 as a window size, for example. Thus, the SACK packet transmitted above indicates RWIN=1.

Meanwhile, when receiving the ACK packets P21, P22, and P23 each indicating ACK=0, the transmission-side apparatus 200 retransmits the data packet P24 indicating the sequence number 0 (lost packet) to the reception-side apparatus 100 since the transmission-side apparatus 200 has the communication function compatible with the SACK.

When receiving the retransmitted data packet P24, the transmission and reception controlling unit 131 of the reception-side apparatus 100 stores the data packet P24 in the receiving buffer memory 120.

As a result, the data packets indicating corresponding sequence numbers 0, 1, and 2 are stored in the receiving buffer memory 120. Thus, the data packets are quickly forwarded to the central controlling unit 140.

Further, receiving the above described SACK packet P26, the transmission-side apparatus 200 transmits to the reception-side apparatus 100 data packets P27, P28, P29 and P30 having sequence numbers (SEQ=3 to 6) specified by the SACK packet P26. In other words, discarded packets (data packets P27, P28, P29, and P30) are collectively retransferred at a high rate.

When receiving the data packets P27, P28, P29, and P30, the transmission and reception controlling unit 131 of the reception-side apparatus 100 stores the data packets in the receiving buffer memory 120. As a result, the discarded packets having the sequence numbers of 3, 4, 5, and 6 are again stored in the receiving buffer memory 120 as the data packets P27, P28, P29 and P30, respectively, and are forwarded to the central controlling unit 140. Then, after that, the data packet P20, having sequence number 7, stored in the receiving buffer memory 120 is also forwarded to the central controlling unit 140.

The high-rate retransfers of the discarded packets as described above causes all the data packets, subject to transmission from the transmission-side apparatus 200 to the central controlling unit 140, to be forwarded to the central controlling unit 140 in response to the ACK packet P12 (ACK=0, RWIN=8); namely, an acknowledgement packet at the high-rate transfer setting.

As a result, the transmission and reception controlling unit 131 judges that return processing for the packet loss has completed, and notifies the window size setting unit 133 of the completion of the return processing. Upon receiving the notification, the window size setting unit 133 again sets to the high-rate transfer.

Figure 8:
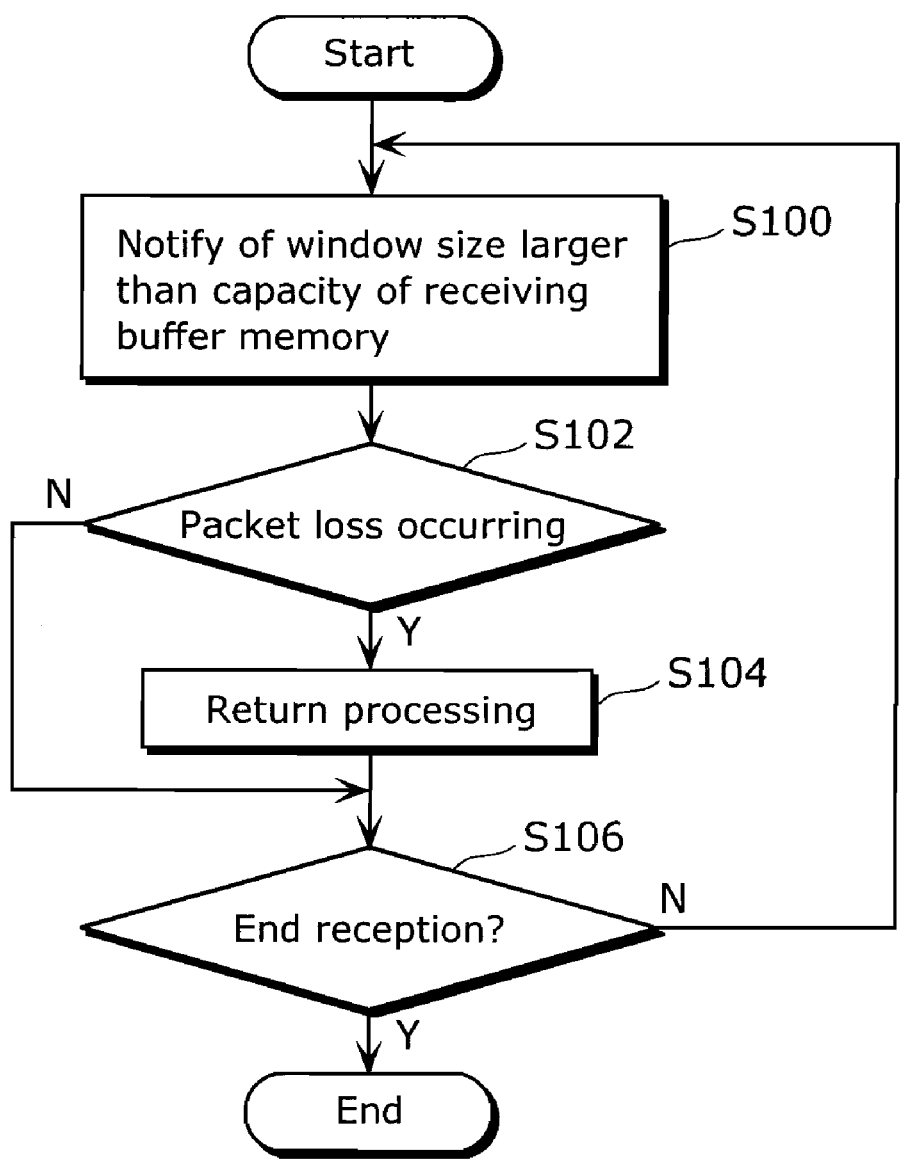
FIG. 8 is a flow chart showing an overall operation of the reception-side apparatus in the embodiment of the present invention.

FIG. 8 is a flowchart illustrating an overall operation of the reception-side apparatus 100 in the present embodiment.

With high-rate transfer setting by the window size setting unit 133, the reception-side apparatus 100, first, generates an ACK packet indicating a window size larger than the capacity of the receiving buffer memory 120 as an acknowledgement packet, and transmits the ACK packet to the transmission-side apparatus 200 (Step S100). This notifies the transmission-side apparatus 200 of the window size, and then the transmission-side apparatus 200 transmits data packets equivalent to the window size.

With response to the ACK packet, the reception-side apparatus 100 judges whether nor not the data packets to have been transmitted from the transmission-side apparatus 200 are lost; that is, whether or not a packet loss has occurred (Step S102). Here, when judging that the packet loss has occurred (Step S102: Y), the reception-side apparatus 100 performs return processing in order to clear a congested state, triggered by the packet loss, of the receiving buffer memory 120 (Step S104).

Meanwhile, when judging that the packet loss has not occurred (Step S102: N) and the return processing has completed, the reception-side apparatus 100 receives all the data packets, equivalent to the window size, notified in Step S100. Then, the reception-side apparatus 100 judges whether or not the reception of the data packets from transmission-side apparatus 200 should be ended (Step S106).

Here, when judging that the reception should not be ended (Step S106: N), the reception-side apparatus 100 repeatedly executes processing from Step S100. When judging that the reception should be ended (Step S106: Y), the reception-side 100 ends the entire processing.

Figure 9:
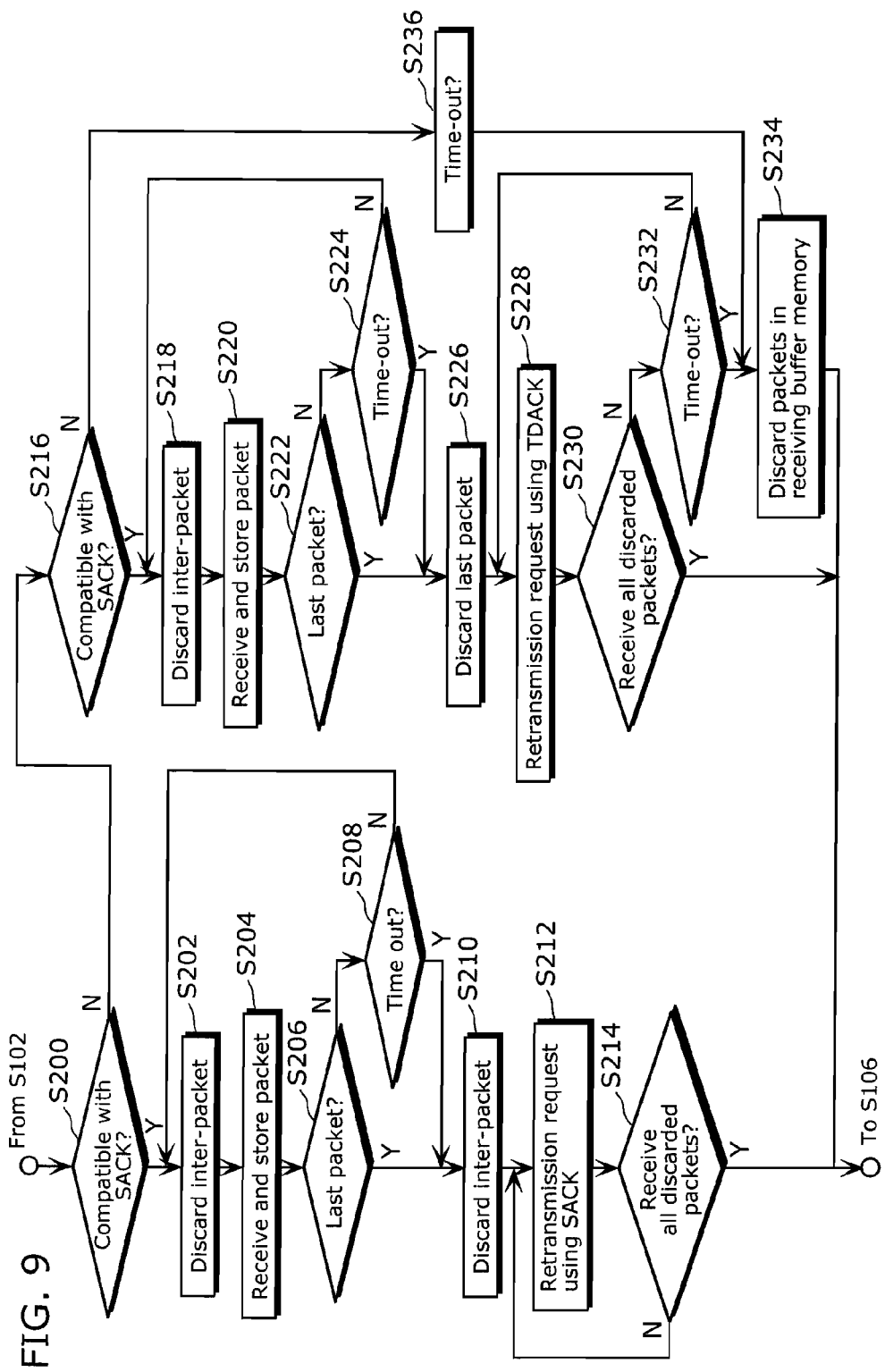
FIG. 9 is a flow chart showing an operation of the reception-side apparatus in return processing (Step S104 in FIG. 8) in the embodiment of the present invention.

FIG. 9 is a flow chart showing an operation of the reception-side apparatus 100 in return processing (Step S104 in FIG. 8).

When establishing a connection with the transmission-side apparatus 200, the reception-side apparatus 100 specifies a communication function of the transmission-side apparatus 200. Thus, an occurrence of a packet loss prompts the reception-side apparatus 100 to execute return processing in accordance with the communication function of the transmission-side apparatus 200.

Specifically, first, the reception-side apparatus 100 judges whether or not the transmission-side apparatus 200 has the communication function compatible with the SACK (Step S200). Here, when judging that the transmission-side apparatus 200 has the communication function compatible with the SACK (Step S200: Y), the reception-side apparatus 100 executes the return processing described using FIG. 7.

In other words, when the receiving buffer memory 120 is in the congested state, the packet discarding unit 134 of the reception-side apparatus 100 discards one inter-packet out of several (four) data packets stored in the receiving buffer memory 120. Here, an inter-packet is a lately-stored data packet, other than the last packet, out of data packets transmitted from the transmission-side apparatus 200 in response to an ACK packet transmitted at high-rate transfer setting immediately before an occurrence of a packet loss.

Discarding the inter-packet as described above makes available space in the receiving buffer memory 120. Hence, after that, transmission of a data packet from transmission-side apparatus 200 causes transmission and reception controlling unit 131 of the reception-side apparatus 100 to receive and store the data packet in the receiving buffer memory 120 (Step S204). As a result, the receiving buffer memory 120 is again in the congested state.

Here, the packet discarding unit 134 of the packet discarding unit 134 judges whether or not the data packet stored in Step S204 is the last packet (Step S206).

Here, when judging that the stored data packet is not the last packet (Step S206: N), the packet discarding unit 134 judges whether or not a predetermined time has elapsed since the transmission of a recent ACK packet (acknowledgement packet) with high-rate transfer setting; that is, whether or not a time out has occurred (Step S208). When judging that the time out has not occurred (Step S208: N), the packet discarding unit 134 again repeatedly executes the processing from Step S202.

Meanwhile, when judging that the stored data packet is the last packet (Step S206: Y), the packet discarding unit 134 discards the inter-packet, with the last packet left in the receiving buffer memory 120 (Step S210). As a result, the receiving buffer memory 120 is out of the congested state, and thus is in a state which is ready to be able to store a lost packet retransmitted from the transmission-side apparatus 200.

Further, when judging that a time out occurs in Step S208 (Step S208: Y), the packet discarding unit 134 regards the inter-packet stored in the most recent Step S204 as the last packet, and discards the other inter-packets with the last packet left in the receiving buffer memory 120 (Step S210). As a result, the receiving buffer memory 120 is out of the congested state, and thus is in the state which is ready to be able to store the lost packet retransmitted from the transmission-side apparatus 200, as described above.

It is noted that when receiving the data packets other than the last packet, the transmission and reception controlling unit 131 transmits, on the reception basis, to the transmission-side apparatus 200 an ACK packet (negative acknowledgement packet) encouraging retransmission of the lost packet. Hence, when the lost packet is retransmitted from the transmission-side apparatus 200 in response to the ACK packet as described above, the transmission and reception controlling unit 131 of the reception-side apparatus 100 receives and stores the lost packet in the receiving buffer memory 120. As a result, several of the data packets including the lost packet, out of the data packets stored in the receiving buffer memory 120, are quickly forwarded to the central controlling unit 140.

Moreover, the reception-side apparatus 100 transmits to the transmission-side apparatus 200 the SACK packet collectively requesting retransmission of all the inter-packets (discarded packets) discarded in Steps S202 and S210 (Step S212).

Then, the reception-side apparatus 100 judges whether or not all the discarded packets are received, using the SACK packet (Step S214). When judging that all of the discarded packets have not been received (Step S214: N), the reception-side apparatus 100 again repeatedly executes the processing from Step S212.

Meanwhile, when judging in Step S200 that the transmission-side apparatus 200 has no communication function compatible with the SACK (Step S200: N), the reception-side apparatus 100 further judges whether or not the transmission-side apparatus 200 has a communication function compatible with the TDACK. Here, when judging that the transmission-side apparatus 200 has the communication function compatible with the TDACK (Step S216: Y), the reception-side apparatus 100 executes the return processing described using FIG. 6.

In other words, when the receiving buffer memory 120 is in the congested state, the packet discarding unit 134 of the reception-side apparatus 100 discards one inter-packet out of the several (four) data packets stored in the receiving buffer memory 120 (Step S218).

Discarding an inter-packet as described above makes available space in the receiving buffer memory 120. Hence, after that, transmission of a data packet from transmission-side apparatus 200 causes transmission and reception controlling unit 131 of the reception-side apparatus 100 to receive and store the data packet in the receiving buffer memory 120 (Step S220). As a result, the receiving buffer memory 120 is again in the congested state.

Here, the packet discarding unit 134 of the reception-side apparatus 100 judges whether or not the data packet stored in Step S220 is the last packet (Step S222).

Here, when judging that the stored data packet is not the last packet (Step S222: N), the packet discarding unit 134 judges whether or not a predetermined time has elapsed since transmission of a recent ACK packet (acknowledgement packet) with high-rate transfer setting; that is, whether or not a time out has occurred (Step S222). When judging that the time out has not occurred (Step S224: N), the packet discarding unit 134 again repeatedly executes the processing from Step S218.

Meanwhile, when judging that the stored data packet is the last packet in Step S222 (Step S222: Y), the packet discarding unit 134 discards the last packet (Step S226). As a result, the receiving buffer memory 120 is out of the congested state, and thus is in a state which is ready to be able to store a lost packet retransmitted from the transmission-side apparatus 200.

Further, when judging that a time out occurs in Step S224 (Step S224: Y), the packet discarding unit 134 regards the inter-packet stored in the most recent Step S220 as the last packet, and discards the last packet (Step S226). As a result, the receiving buffer memory 120 is out of the congested state, and thus is in the state which is ready to be able to store the lost packet retransmitted from the transmission-side apparatus 200, as described above.

It is noted that when receiving data packets, the transmission and reception controlling unit 131 transmits, on the reception basis, to the transmission-side apparatus 200 an ACK packet (negative acknowledgement packet) encouraging retransmission of a lost packet. Hence, when the lost packet is retransmitted from the transmission-side apparatus 200 in response to the ACK packet as described above, the transmission and reception controlling unit 131 of the reception-side apparatus 100 receives and stores the lost packet in the receiving buffer memory 120. As a result, several of data packets including the lost packet, out of the data packets stored in the receiving buffer memory 120, are quickly forwarded to the central controlling unit 140.

Further, receiving the lost packet retransmitted after Step S226, the reception-side apparatus 100 transmits to the transmission-side apparatus 200 four ACK packets requesting retransmission of one discarded packet (negative acknowledgement packets) out of all the inter-packets (discarded packets) discarded in Steps S218 and S226 (Step S228). It is noted that three out of the four ACK packets are the TDACK packets.

Then, the reception-side apparatus 100 judges whether or not all the discarded packets are received by receiving the TDACK packets (Step S230). Here, when judging that not all the discarded packets have been received (Step S230: N), the reception-side apparatus 100 judges whether or not a predetermined time has elapsed since transmission of a recent ACK packet (acknowledgement packet) with high-rate transfer setting; that is, whether or not a time out has occurred (Step S232). When judging that the time out has not occurred, (Step S232: N), the reception-side apparatus 100 again executes the processing from Step S228.

Meanwhile, when the reception-side apparatus 100 judges that the time out has occurred, (Step S232: Y) the packet discarding unit 134 of the reception-side apparatus 100 discards all the data packets in the receiving buffer memory 120, and receives a data packet retransmitted from the transmission-side apparatus 200 (Step S234).

It is noted that, before the retransmission request of the discarded packets in Step S228, the reception-side apparatus 100 may compare: a required time between sequential retransfer and reception of all the discarded packets by a retransmission request; and a required time between retransmission and reception of all the discarded packets by a time out. Here, when judging that the time in the retransmission request is shorter than the time in the time out, the reception-side apparatus 100 executes the processing in Step S228. To the contrary, when judging that the time in the time out is shorter than the time in the retransmission request, the reception-side apparatus 100 does not execute the processing in Step S228, and stands by until the time out occurs.

Moreover, when judging that the transmission-side apparatus 200 has no communication function compatible with the TDACK in Step S200 (Step S216: N), the reception-side apparatus 100 executes the return processing with a time out.

In other words, the reception-side apparatus 100 stands by until a time out occurs (Step S236), and executes the processing in Step S234 described above.

In the embodiment, an ACK packet notifies the transmission-side apparatus 200 of a window size larger than the capacity of the receiving buffer memory 120, as described above. Accordingly, the transmission-side apparatus 200 can transmit a lot of data in the RTT even though the capacity of the receiving buffer memory 120 is small. As a result, efficient data transfer is available without an environmental restriction, such as a storage capacity.

Further in the embodiment, when the receiving buffer memory 120 is in the congested state due to a packet loss, a data packet stored in the receiving buffer memory 120 is discarded, and available space is secured. Hence, by storing a retransmitted lost packet in the receiving buffer memory 120, a lot of data packets stored in the receiving buffer memory 120 can be forwarded to an application program of the central controlling unit 140. As a result, a congested state of the receiving buffer memory 120 and the following suspension of data receiving process (data transfer) can be prevented.

Further, the request of retransmission of a discarded data packet enables the discarded data packet to be re-received and stored in the receiving buffer memory 120 before a time out occurs. As a result, even data reception processing (data transfer) is possibly disrupted, significant deterioration of data transfer efficiency can be avoided. In other words, all the data packets transmitted from the transmission-side apparatus 200 can be quickly received based on the window size set with high-rate transfer setting and notified.

Modification Example 1

The reception-side apparatus 100 in the above embodiment requests the transmission-side apparatus 200 to retransmit a discarded packet when the transmission-side apparatus 200 has the communication function compatible with the TDACK or the SACK. The communications apparatus in the present invention, however, may not request the transmission-side apparatus 200 to retransmit the discarded packet.

Figure 10:
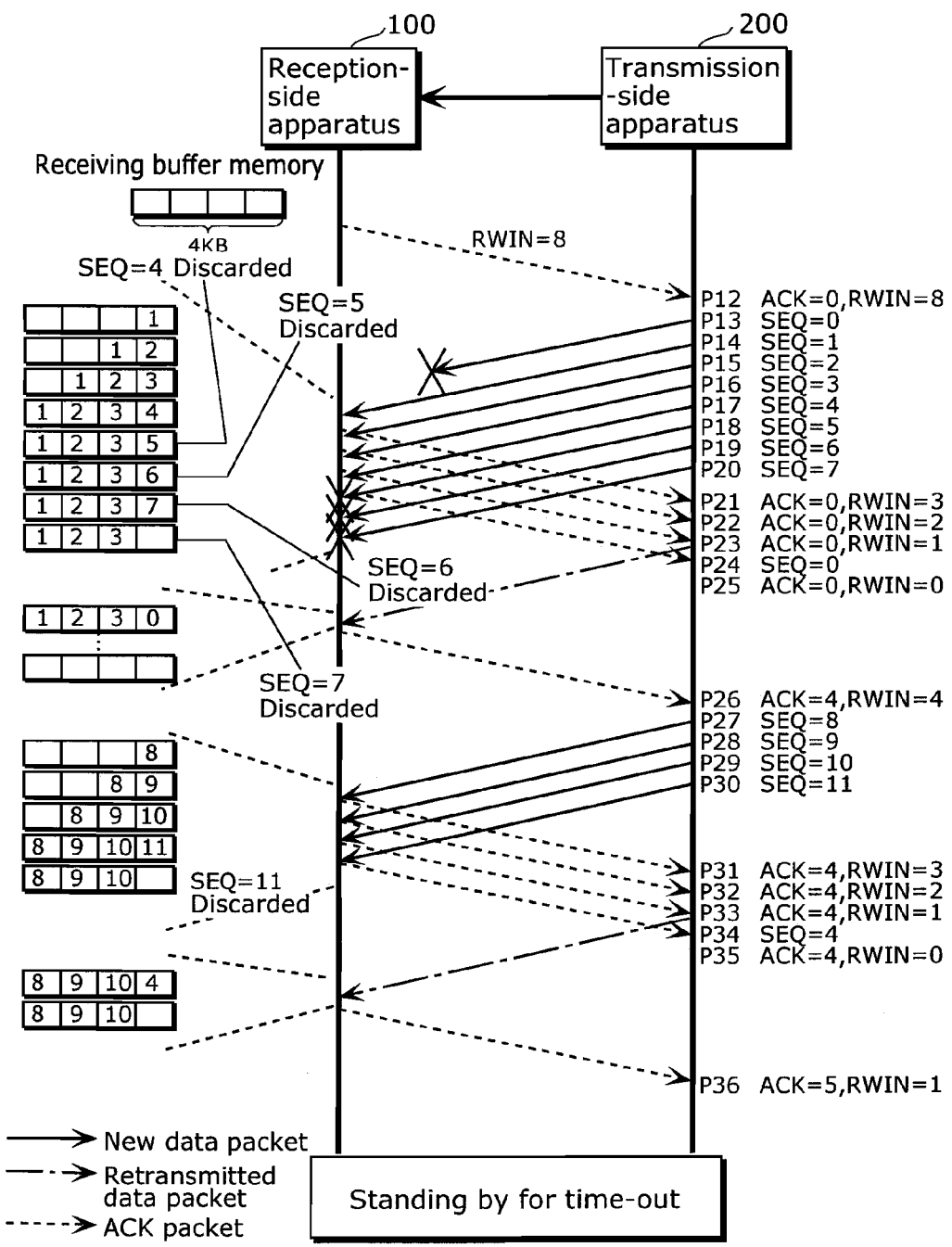
FIG. 10 is a sequence diagram exemplifying a communication between the reception-side apparatus and the transmission-side apparatus in a modification example 1 of the embodiment of the present invention.

FIG. 10 is a sequence diagram exemplifying a communication between the reception-side apparatus 100 and the transmission-side apparatus 200 in the modification. It is noted in the example that the transmission-side apparatus 200 has a communication function compatible with the TDACK.

First, executing similar processing to that in FIGS. 6 and 7, the reception-side apparatus 100 receives and stores the data packet P17 having the sequence number 4 in the receiving buffer memory 120. As a result, the receiving buffer memory 120 is in the congested state, as described above.

Here, the packet discarding unit 134 discards the data packet P17 having the sequence number 4 in order to get out of the congested state, and notifies the ACK generating unit 132 of the sequence number 4 of the discarded packet. Then, the transmission and reception controlling unit 131 stores the received data packet P18 (SEQ=5), transmitted from the transmission-side apparatus 200, in the receiving buffer memory 120.

When the data packet P18 (SEQ=5) is stored in the receiving buffer memory 120, the receiving buffer memory 120 stores the data packets P14, P15, P16, and P18 (SEQ=1, 2, 3, and 5) to be in the congested state again.

Here, the packet discarding unit 134 discards the data packet P18 having the sequence number 5 in order to get out of the congested state, and notifies the ACK generating unit 132 of the sequence number 5 of the discarded packet. Then, the packet discarding unit 131 stores the received data packet P19 (SEQ=6), transmitted from the transmission-side apparatus 200, in the receiving buffer memory 120.

Storing and discarding the data packets described above are repeated until the reception-side apparatus 100 receives the data packet having the sequence number 7 (last packet). Consequently, the data packet P20 (SEQ=7) stored in the receiving buffer memory 120 is deleted, and the receiving buffer memory 120 obtains available space. Accordingly, the receiving buffer memory 120 is ready to able to store a new data packet.

Further, when receiving the data packets P14, P15, P16, and P17, the reception-side apparatus 100 transmits on the reception basis the ACK packets (negative acknowledgement packets) each indicating P21, P22, P23, and P25, similar to the processing in FIGS. 6 and 7.

Meanwhile, when receiving the ACK packets P21, P22, and P23 each indicating ACK=0, the transmission-side apparatus 200 retransmits the data packet P24 indicating the sequence number of 0 (lost packet) to the reception-side apparatus 100 since the transmission-side apparatus 200 has the communication function compatible with the TDACK.

When receiving the retransmitted data packet P24, the transmission and reception controlling unit 131 of the reception-side apparatus 100 stores the data packet P24 in the receiving buffer memory 120.

As a result, data packets indicating associated sequence numbers 0, 1, 2, and 3 are stored in the receiving buffer memory 120. Thus, the data packets are quickly forwarded to the central controlling unit 140.

Moreover, when receiving the retransmitted data packet P24, the transmission and reception controlling unit 131 transmits to the transmission-side apparatus 200 the ACK packet (negative acknowledgement packet) with respect to the data packet P24. This ACK packet P26 indicates ACK=4 and RWIN=4.

In other words, the ACK generating unit 132 generates the ACK packet P26 indicating: the window size (RWIN=4) set by the regular transfer setting of the window size setting unit 133; and the ACK number (ACK=4) identical to the sequence number 4 of the discarded packet which the packet discarding unit 134 notifies of.

Since having already transmitted the data packets P13 to P20 with the respective sequence numbers 0 to 7, when receiving the ACK packet P26 indicating ACK=0 and RWIN=4, the transmission-side apparatus 200 transmits to the reception-side apparatus 100 the data packets P27, 28, 29, and 30 indicating the respective sequence numbers 8, 9, 10, and 11.

The transmission and reception controlling unit 131 of the reception-side apparatus 100 sequentially receives the data packets P27, P28, P29, and P30, and stores in order the data packets (SEQ=8, 9, 10, 11) in the receiving buffer memory 120. However, since the data packet P17 having the sequence number 4 has not been stored in the receiving buffer memory 120, the data packets P27, P28, P29 and P30 cannot be forwarded to the central controlling unit 140. Thus, available space of the receiving buffer memory 120 runs out. In other words, the receiving buffer memory 120 is in the congested state here.

Then, the packet discarding unit 134 discards the data packet P30 having the sequence number 11, and notifies the ACK generating unit 132 of the sequence number 11 of the discarded packet. As a result, the receiving buffer memory 120 is temporarily out of the congested state, and obtains available space. Hence, the receiving buffer memory 120 is ready to store a new data packet.

Further, receiving the above described data packets P27, P28, P29 and P30, the reception-side apparatus 100 transmits, by each of the receptions, the ACK packets P31, P32, P33, and P35; namely negative acknowledgement packets indicating ACK=4, to the transmission-side apparatus 200 since the received data packets do not have the sequence number 0.

In other words, the data packet P27 (SEQ=8), received by the transmission and reception controlling unit 131, does not have a sequence number identical to the ACK number 4 in which the ACK packet P26 indicates. Hence, the ACK generating unit 132 generates the ACK packet P31 as a negative acknowledgement packet, and causes the ACK packet P31 to be transmitted from the transmission and reception controlling unit 131 to the transmission-side apparatus 200. Here, the ACK packet P31 indicates the window size (RWIN=3) set by the regular transfer setting of the window size setting unit 133 and the above described ACK number 4.

Moreover, the data packet P28 (SEQ=9), received by the transmission and reception controlling unit 131, does not have a sequence number identical to the ACK number 4 which the ACK packet P28 indicates. Hence, the ACK generating unit 132 generates the ACK packet P32 as a negative acknowledgement packet, and causes the ACK packet P32 to be transmitted from the transmission and reception controlling unit 131 to the transmission-side apparatus 200. Here, the ACK packet P32 indicates the window size (RWIN=2) set by the regular transfer setting of the window size setting unit 133 and the above described ACK number 4.

Hence, the reception-side apparatus 100 transmits, by each reception of the data packet, the ACK packet indicating ACK=4 to the transmission-side apparatus 200 until receiving the data packet P30.

Meanwhile, when receiving the ACK packets P31, P32, and P33 each indicating ACK=4, the transmission-side apparatus 200 retransmits the data packet P34 indicating the sequence number 4 to the reception-side apparatus 100 since the transmission-side apparatus 200 has the communication function compatible with the TDACK.

When receiving the retransmitted data packet P34, the transmission and reception controlling unit 131 of the reception-side apparatus 100 stores the data packet P34 in the receiving buffer memory 120.

As a result, the data packet indicating the sequence number 4 is stored in the receiving buffer memory 120, and thus the data packet is quickly forwarded to the central controlling unit 140.

Further, when receiving the retransmitted data packet P34, the transmission and reception controlling unit 131 of the reception-side apparatus 100 transmits the ACK packet (negative acknowledgement packet) P36 to the transmission-side apparatus 200. This ACK packet P36 indicates ACK=5 and RWIN=1.

In other words, the ACK generating unit 132 generates the ACK packet P36 indicating: the window size (RWIN=1) set by the regular transfer setting of the window size setting unit 133; and the ACK number (ACK=5) identical to the sequence number 5 of the discarded packet which the packet discarding unit 134 notifies of.

Here, transmission processing is carried out between the reception-side apparatus 100 and the transmission-side apparatus 200. Still, retransmission of the discarded packet is not requested. Thus, it is time consuming between receiving of all the data packets, by the reception-side apparatus 100, having the sequence numbers 0 to 7 indicated in the first ACK packet P12 and forwarding the data packets to the central controlling unit 140. In addition, when a predetermined time has elapsed with all the data packets having the sequence numbers 0 to 7 not received since transmitting and receiving the ACK packet P12, a time out occurs. For example, when the time out occurs after the ACK packet P36 has transmitted, the data packets having the sequence numbers 5 to 7 are retransmitted from the transmission-side apparatus 200. Hence, when the predetermined time has elapsed with all the data packets having the sequence numbers 0 to 7 not received since transmitting and receiving the ACK packet P12, the reception-side apparatus 100 judges that the time out has occurred, and discards all the data packets in the receiving buffer memory 120.

As a result, the reception-side apparatus 100 again transmits the ACK packet, indicating the window size (RWIN=8) set by the high-rate transfer setting, to the transmission-side apparatus 200, and sequentially receives, out of the data packets having the sequence number 8, each of the data packets.

Modification Example 2

In the above embodiment, the reception-side apparatus 100 includes the central controlling unit 140 utilizing data transmitted from the transmission-side apparatus 200 and the main memory 150; meanwhile, the reception-side apparatus 100 may not include these. In other words, the communications apparatus in the present invention may be a reception relaying apparatus which relays the data transmitted from the transmission-side apparatus 200 and transmits the data to a data processing apparatus utilizing the data.

Figure 11:
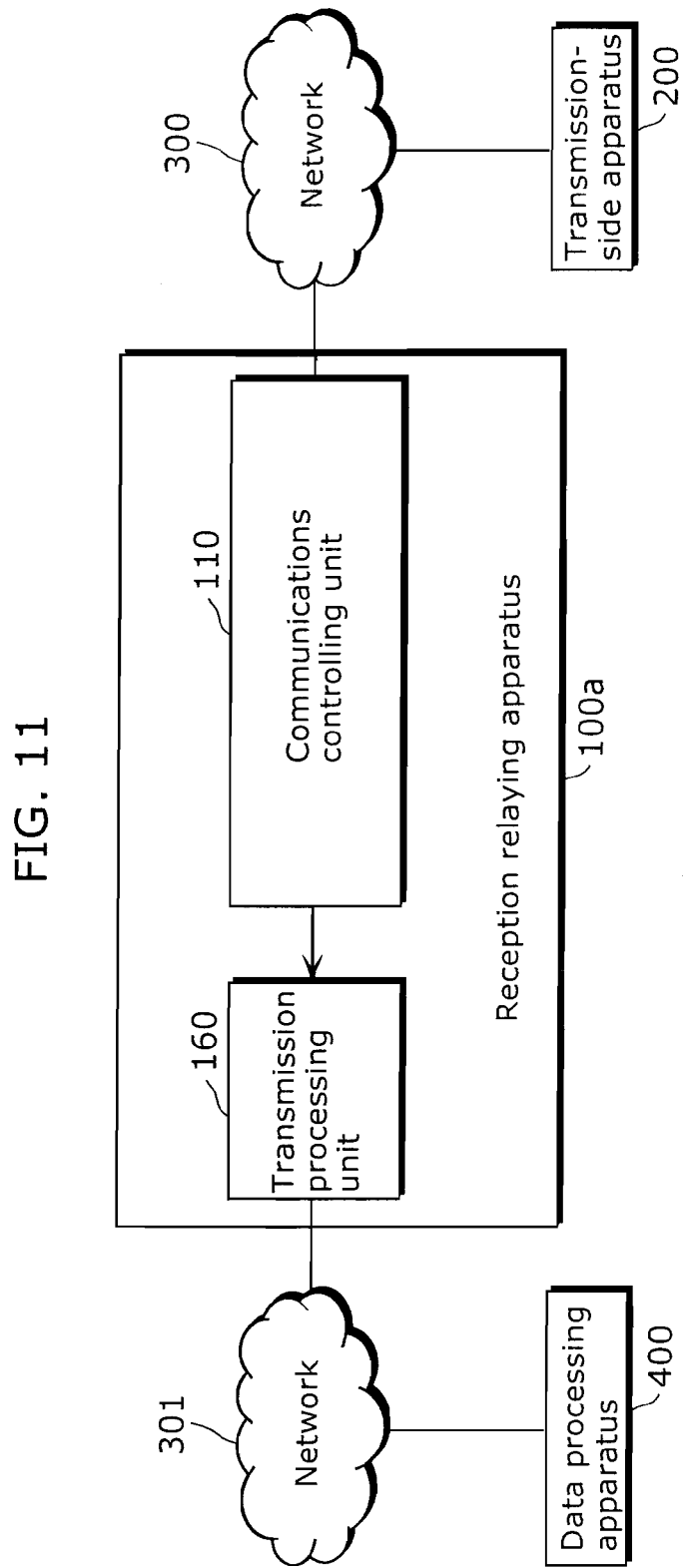
FIG. 11 is a block diagram showing a structure of a reception relaying apparatus in a modification example 2 of the embodiment of the present invention.

FIG. 11 is a block diagram illustrating a structure of the reception relaying apparatus in the modification example.

A reception relaying apparatus 100a is connected to the transmission-side apparatus 200 via the network 300, and establishes a communication to the transmission-side apparatus 200 in accordance with the TCP/IP. Further, the reception relaying apparatus 100a is connected to a data processing apparatus 400 via the network 301.

The reception relaying apparatus 100a, structured as the terminal of the TCP/IP, receives the data transmitted from the transmission-side apparatus 200, and forwards the received data to the data processing apparatus 400. In other words, the reception relaying apparatus 100a and the data processing apparatus 400 structure the reception-side apparatus 100 in the above embodiment.

In addition, the reception relaying apparatus 100a includes the communications controlling unit 110 of the reception-side apparatus 100 and a transmission processing unit 160. The transmission processing unit 160 is structured as a processing unit to retrieve a data packet stored in the receiving buffer memory 120 of the communications controlling unit 110, and to transmit the data packet to the data processing apparatus 400.

Modification Example 3

The reception-side apparatus 100 in the embodiment sets a window size on a communications flow-to-communications flow basis, so that the sum of each of window sizes corresponding to plural communications flows becomes larger than the capacity of receiving buffer memory 120.

Figure 12:
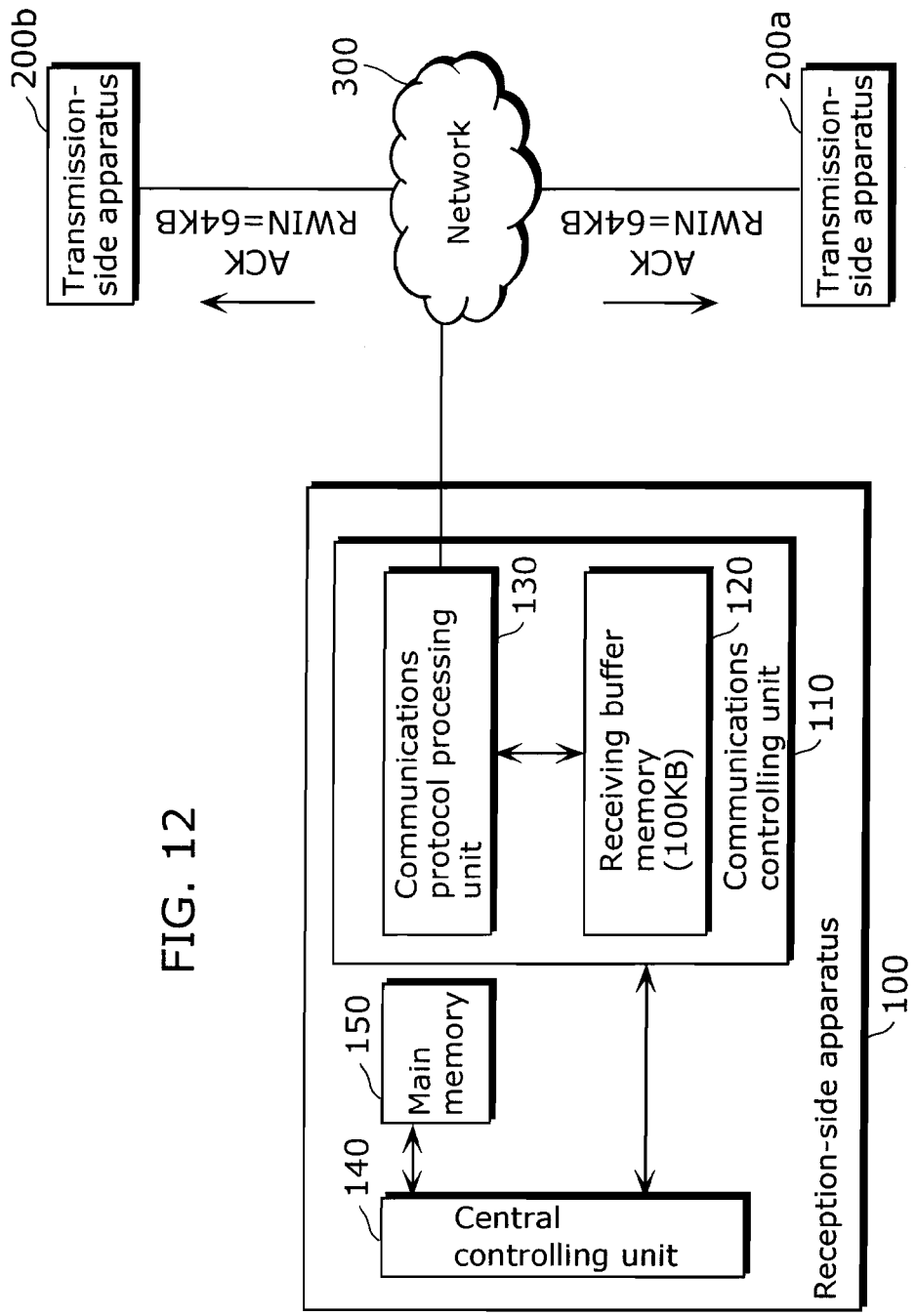
FIG. 12 describes an operation of the reception-side apparatus in a modification example 3 of the embodiment of the present invention.

FIG. 12 describes an operation of the reception-side apparatus 100 in the modification.

The reception-side apparatus 100 executes in parallel processing to receive data from transmission-side apparatuses 200a and 200b. Here, the window size setting unit 133 of the reception-side apparatus 100 sets, for example, a 64 KB-window size to each of the transmission-side apparatuses 200a and 200b.

In other words, the window size setting unit 133 sets a window size smaller than the capacity of the receiving buffer memory 120 (100 KB) to each of transmission-side apparatuses (communications flows). Here, the window size setting unit 133 sets a window size to each of the transmission-side apparatuses (each of the communications flows) in order that the sum of each of window sizes to be set to all the transmission-side apparatuses (all the communications flows) becomes larger than the capacity of the receiving buffer memory 120 (100 KB). Hereinafter, a window size set to one transmission-side apparatus (one communications flow) is referred to as an extended window size.

Hence, the reception-side apparatus 100 notifies each of the transmission-side apparatuses 200a and 200b of the extended window size (RWIN=64), using the ACK packet.

It is noted in the above described example that the plural communications flows are set between the reception-side apparatus 100 and each of the plural transmission-side apparatuses. Instead, the plural communications flows may be set between the reception-side apparatus 100 and one transmission-side apparatus. In other words, the reception-side apparatus 100 in the modification sets the extended window size described above on a communications flow-to-communications flow basis, regardless of the number of the transmission-side apparatuses.

In the modification example, as described above, the sum of the extended window sizes (RWIN=64) to be notified of at each of the communications flows is larger than the capacity of the receiving buffer memory 120 (100 KB), and thus throughput can be improved unless processing of the plural communications flows is simultaneously disrupted.

Modification Example 4

Similar to the reception-side apparatus 100 in the above described modification example 3, the reception-side apparatus 100 in the modification example 4 sets an extended window size to each of the communications flows, and notifies the transmission-side apparatus of the extended window size. Here, the reception-side apparatus 100 in the modification example 4 sets an extended window size in accordance with a priority level of the communications flow.

Figure 13:
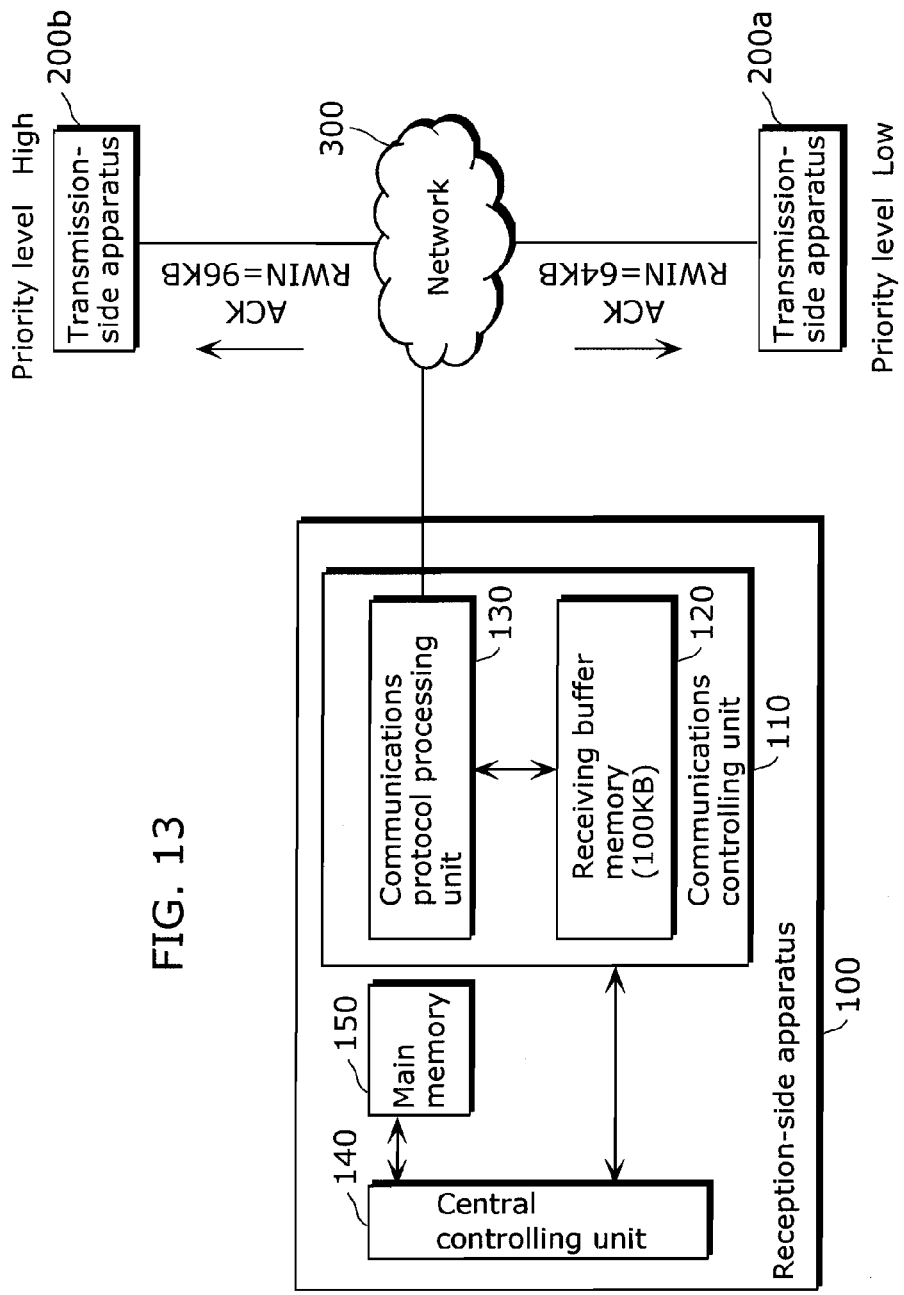
FIG. 13 describes an operation of the reception-side apparatus in a modification example 4 of the embodiment of the present invention.

FIG. 13 describes an operation of the reception-side apparatus 100 in the modification.

The reception-side apparatus 100 executes in parallel processing to receive data from, for example, transmission-side apparatuses 200a and 200b. Here, the communications protocol processing unit 130 of the reception-side apparatus 100 determines priority levels to the communications flows of the transmission-side apparatuses 200a and 200b. Then, the window size setting unit 133 of the communications protocol processing unit 130 sets a larger extended window size to a communications flow having a higher priority level, and a smaller extended window size to a communications flow having a lower priority level. In other words, the communications protocol processing unit 130 is structured to be a priority level determining unit in the modification example.

For example, the communications protocol processing unit 130 determines: the high priority level to the communications flow of the transmission-side apparatus 200b; and the low priority level to the communications flow to the transmission-side apparatus 200a. In this case, the window size setting unit 133 sets, for example, a 96 KB-extended window size to the communications flow of the transmission-side apparatus 200b. Meanwhile, the window size setting unit 133 sets, for example, a 64 KB-extended window size to the communications flow of the transmission-side apparatus 200a.

When determining a priority level, the communications protocol processing unit 130 determines the priority level based on a communications protocol and an application program executed in the central controlling unit 140. For example, when a file is received by the communications flow in accordance with the FTP (File Transfer Protocol), the communications protocol processing unit 130 determines the low priority level to the communications flow. When a moving picture is received by the communications flow on streaming distribution in accordance with the HTTP (Hyper Text Transfer Protocol), the communications protocol processing unit 130 determines the high priority to the communications flow.

As described above, when receiving data in parallel by each of the plural communications flows, the reception-side apparatus 100 dynamically determines, at each of receptions, a priority level to each of the plural communications flows, and sets an extended window size.

In addition, the reception-side apparatus 100 may determine a static priority level to the transmission-side apparatus. In this case, for example, the reception-side apparatus 100 always determines a low priority level to the transmission-side apparatus 200a and a high priority level to the transmission-side apparatus 200b. Thus, when receiving the data from the transmission-side apparatuses 200a and 200b, the reception-side apparatus 100 sets a small extended window size to the transmission-side apparatus 200a and a large extended window size to the transmission-side apparatus 200b, regardless of the details of the data and the communications protocol.

It is noted in the above described example that the plural communications flows are set between the reception-side apparatus 100 and each of the plural transmission-side apparatuses. Instead, the plural communications flows may be set between the reception-side apparatus 100 and one transmission-side apparatus.

As described above, throughput can be freely controlled in the embodiment based on a priority level.

Modification Example 5

Similar to the reception-side apparatus 100 in the above described modification example 3, the reception-side apparatus 100 in the modification example 5 sets an extended window size to each of the communications flows, and notifies the transmission-side apparatus of the extended window size. Here, the reception-side apparatus 100 in the modification example 5 sets an extended window size in accordance with the number of the communications flows.

Figure 14:
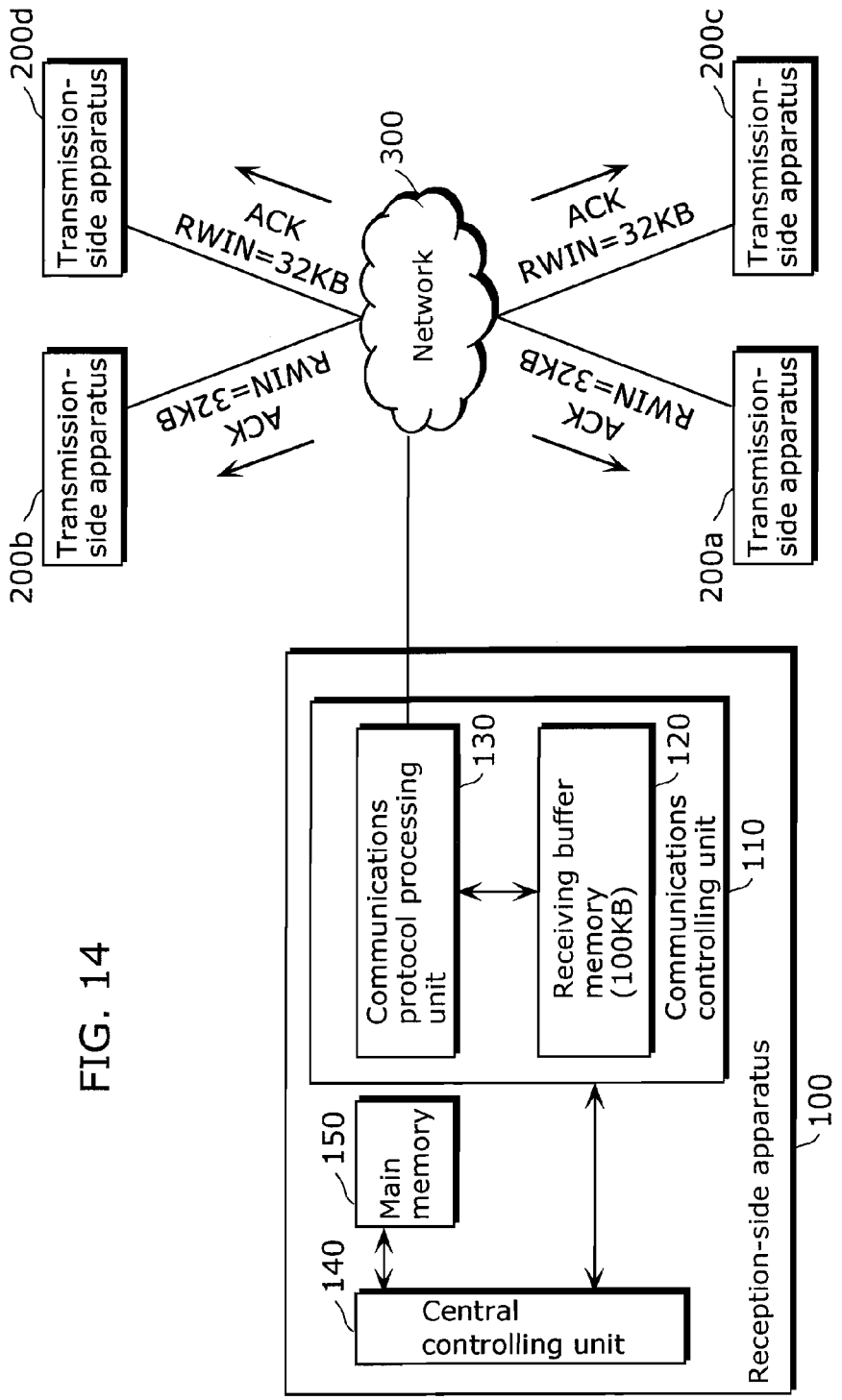
FIG. 14 describes an operation of the reception-side apparatus in a modification example 5 of the embodiment of the present invention.

FIG. 14 describes an operation of the reception-side apparatus 100 in the modification example.

As illustrated in FIG. 12, for example, when executing processing in parallel to receive data from two transmission-side apparatuses 200a and 200b, the reception-side apparatus 100 sets a 64 KB-extended window size to each of the communications flows of the transmission-side apparatuses 200a and 200b.

Further, as shown in FIG. 14, for example, when executing processing in parallel to receive data from four transmission-side apparatuses 200a to 200d, the reception-side apparatus 100 sets a 32 KB-extended window size to each of the communications flows, the transmission-side apparatuses 200a to 200d.

As described above, the reception-side apparatus 100 sets a smaller extended window size as the number of the transmission-side apparatuses (communications flows) increases.

It is noted in the above described example that the plural communications flows are set between the reception-side apparatus 100 and each of the plural transmission-side apparatuses. Instead, the plural communications flows may be set between the reception-side apparatus 100 and one transmission-side apparatus.

As described above, throughput can be controlled in the embodiment in accordance with the number of communications flows.

Modification Example 6

Similar to the reception-side apparatus 100 in the above described modification example 3, the reception-side apparatus 100 in the modification example 6 sets an extended window size to each of the communications flows, and notifies the transmission-side apparatus of the extended window size. Here, the reception-side apparatus 100 in the modification example 6 sets an extended window size in accordance with a propagation delay time of the communications flow.

Figure 15:
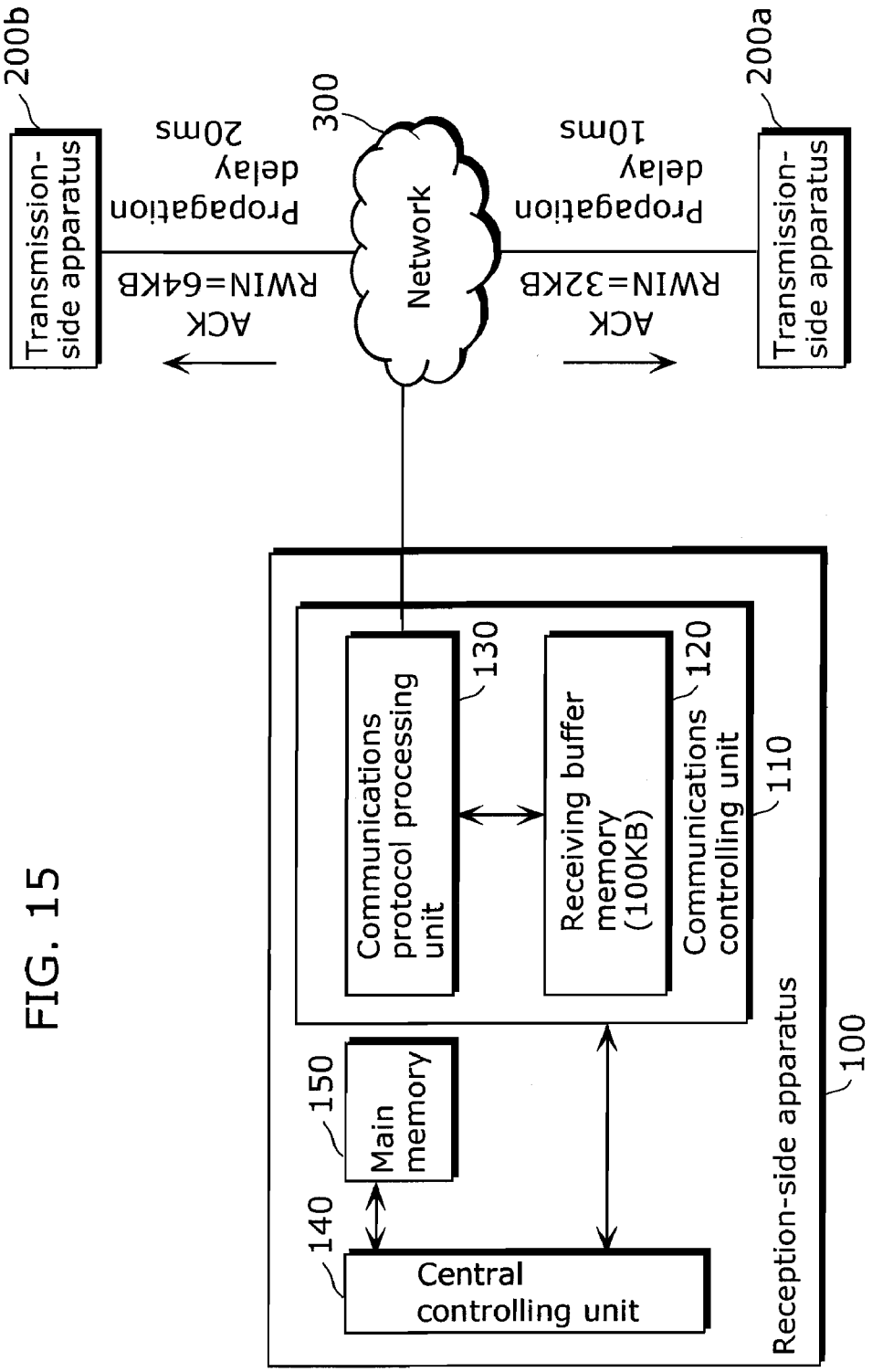
FIG. 15 describes an operation of the reception-side apparatus in a modification example 6 of the embodiment of the present invention.

FIG. 15 describes an operation of the reception-side apparatus 100 in the modification example.

The reception-side apparatus 100 executes in parallel processing to receive data from transmission-side apparatuses 200a and 200b. Here, the communications protocol processing unit 130 of the reception-side apparatus 100 specifies propagation delay time times to the communications flows of the transmission-side apparatuses 200a and 200b.

It is noted that the propagation delay time is equivalent to a half of the remaining time which a delay time in a buffer is subtracted from the RTT. Further, when the reception-side apparatus 100 is structured as the reception relaying apparatus 100a in the modification example 2, the above-described propagation delay time may be a time either: between the transmission-side apparatus 200 and the reception relaying apparatus 100a; or between the transmission-side apparatus 200 and the data processing apparatus 400.

Then, the window size setting unit 133 of the communications protocol processing unit 130 sets a large extended window size to a communications flow having a long propagation delay time, and a small extended window size to a communications flow having a short propagation delay time. This allows a communication time of each of the communications flows to make almost equal in length.

For example, the communications protocol processing unit 130 specifies the propagation delay time (10 ms) to the communications flow of the transmission-side apparatus 200a and the propagation delay time (20 ms) to the communications flow of the transmission-side apparatus 200b.

In this case, the window size setting unit 133 sets, for example, a 32 KB-expanded window size to the communications flow of the transmission-side apparatus 200a. Meanwhile, the window size setting unit 133 sets, for example, a 64 KB-extended window size to the communications flow of the transmission-side apparatus 200b.

When specifying a propagation delay time in the communications flow, the communications protocol processing unit 130 measures the propagation delay time, using the PING (Packet Internet Groper), for example.

As described above, when receiving data in parallel by each of the plural communications flows, the reception-side apparatus 100 specifies a propagation delay time to each of the communications flows, at each of receptions, and sets an extended window size.

It is noted in the above described example that the reception-side apparatus 100 sets a large extended window size to a communications flow having a long propagation delay time, and a small extended window size to a communications flow having a short propagation delay time. Meanwhile, the setting can be reversed. In other words, the reception-side apparatus 100 sets: the small expanded window size to the communications flow having a long propagation delay time; and the large expanded window size to the communications flow having a short propagation delay time. This enables: a communication time of the communications flow having a short propagation delay time to be minimized; and a large window size to be set to the other communications flow upon ending of the communications flow.

It is noted in the above described example that the plural communications flows are set between the reception-side apparatus 100 and each of the plural transmission-side apparatuses. Instead, the plural communications flows may be set between the reception-side apparatus 100 and one transmission-side apparatus.

As described above, throughput can be controlled in the embodiment in accordance with a situation of a network, such as the propagation delay time.

Modification Example 7

Similar to the reception-side apparatus 100 in the above described modification example 3, the reception-side apparatus 100 in the modification example 7 sets an extended window size to each of the communications flows, and notifies the transmission-side apparatus of the extended window size. Here, the reception-side apparatus 100 in the modification example 7 sets to an extended window size in accordance with a transmission band of the communications flow.

Figure 16:
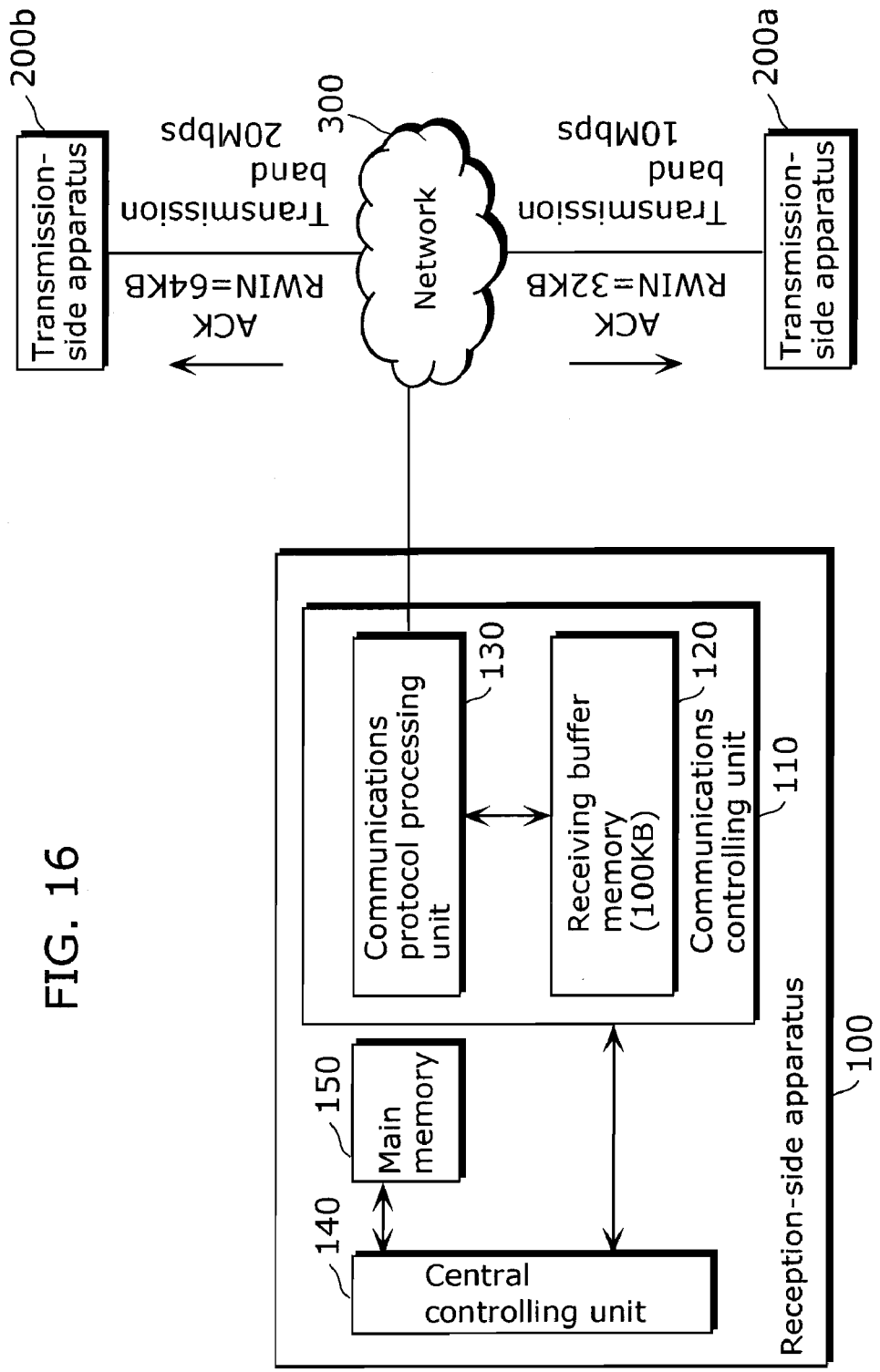
FIG. 16 describes an operation of the reception-side apparatus in a modification example 7 of the embodiment of the present invention.

FIG. 16 describes an operation of the reception-side apparatus 100 in the modification example.

The reception-side apparatus 100 executes in parallel processing to receive data from, for example, transmission-side apparatuses 200a and 200b. Here, the communications protocol processing unit 130 of the reception-side apparatus 100 specifies transmission bands to the communications flows of the transmission-side apparatuses 200a and 200b.

Then, the window size setting unit 133 of the communications protocol processing unit 130 sets a large extended window size to a communications flow having a wide transmission band, and a small extended window size to a communications flow having a narrow transmission band. This can reduce an occurrence of a packet loss.

For example, the communications protocol processing unit 130 specifies a transmission band of the communications flow in the transmission-side apparatus 200a (10 Mbps) and a transmission band to a transmission band of the communications flow in the transmission-side apparatus 200b (20 Mbps).

In this case, the window size setting unit 133 sets, for example, a 32 KB-expanded window size to the communications flow of the transmission-side apparatus 200a. Meanwhile, the window size setting unit 133 sets, for example, a 64 KB-extended window size to the communications flow of the transmission-side apparatus 200b.

When specifying the transmission band of a communications flow, the communications protocol processing unit 130, for example, finds out to specify a band in which a packet loss occurs.

As described above, when receiving data in parallel by each of the plural communications flows, the reception-side apparatus 100 specifies a transmission band to each of the communications flows, at each of receptions, and sets an extended window size.

In addition, the reception-side apparatus 100 may specify a static transmission band to a communications medium of the communications flow. In this case, the reception-side apparatus 100 always specifies, for example: a wide transmission band to a communications medium including an optical fiber; and a narrow transmission band to a communications medium including the wireless LAN.

Hence, when receiving data from the transmission-side apparatus 200a communicating via the wireless LAN, the reception-side apparatus 100 always sets a small extended window size. When receiving data from the transmission-side apparatus 200b communicating via the optical fiber, the reception-side apparatus 100 always sets a large extended window size.

It is noted in the above described example that the plural communications flows are set between the reception-side apparatus 100 and each of the plural transmission-side apparatuses. Instead, the plural communications flows may be set between the reception-side apparatus 100 and one transmission-side apparatus.

As described above, throughput can be controlled in the embodiment in accordance with a situation of a network, such as the transmission band.

Modification Example 8

Similar to the reception-side apparatus 100 in the above described modification example 3, the reception-side apparatus 100 in the modification example 8 sets an extended window size to each of the communications flows, and notifies the communications flow of the extended window size. Here, the reception-side apparatus 100 in the modification example 8 changes the extended window size in accordance with the available space of the receiving buffer memory 120.

Figure 17:
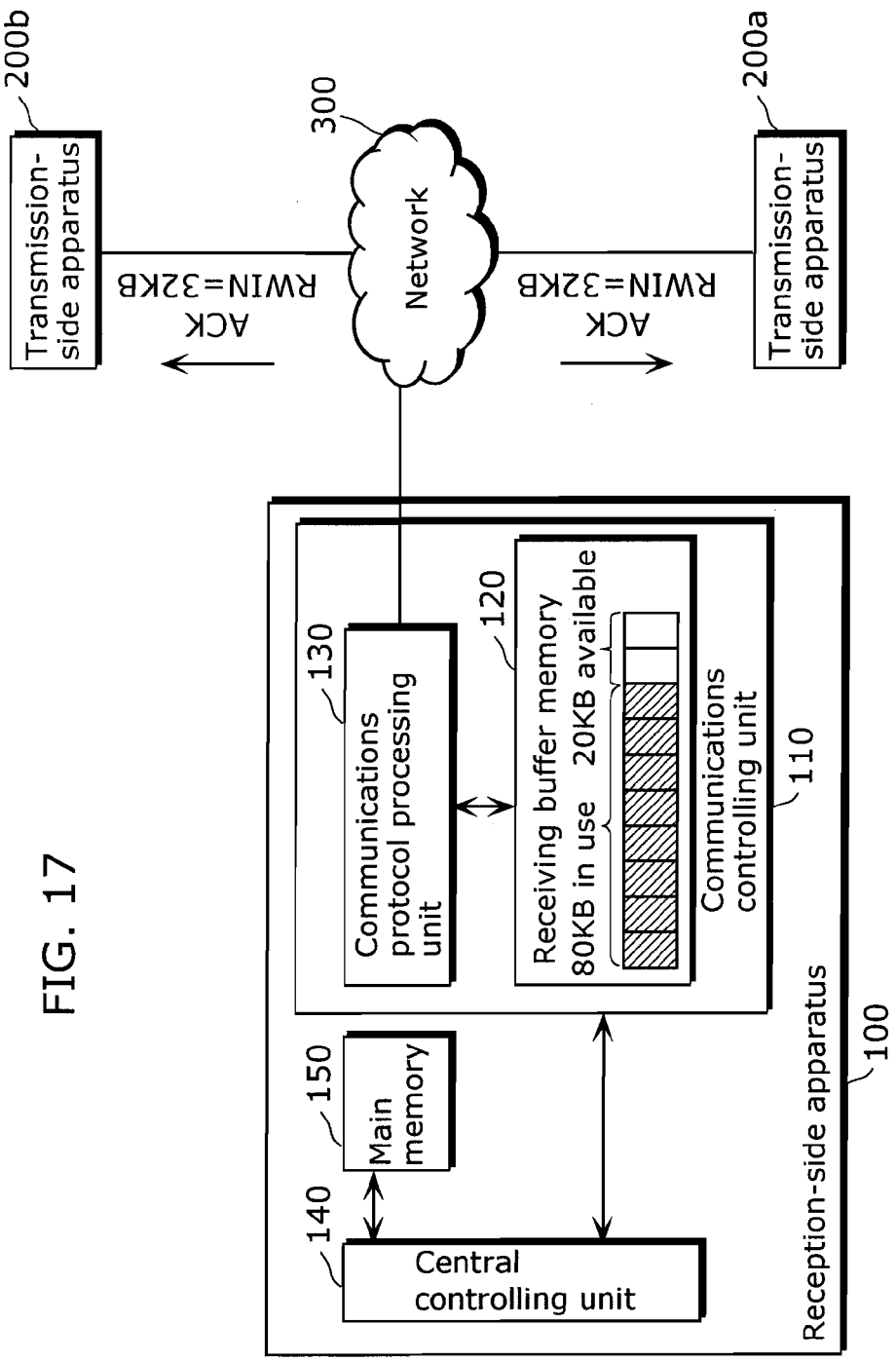
FIG. 17 describes an operation of the reception-side apparatus in a modification example 8 of the embodiment of the present invention.

FIG. 17 describes an operation of the reception-side apparatus 100 in the modification example.

As shown in FIG. 12 when processing in parallel to receive data from the transmission-side apparatuses 200a and 200b, for example, the reception-side apparatus 100 sets a 64-KB extended window size to each of the communications flows of the transmission-side apparatuses 200a and 200b in the case where the buffer memory 120 has available space of as much as 100 KB.

Now, once the speed of forwarding the data, stored in the receiving buffer memory 120, to central controlling unit 140 reduces, the available space of the receiving buffer memory 120 decreases to be 20 KB, as shown in FIG. 17.

Here, the reception-side apparatus 100, for example, temporarily changes the extended window size (64 KB) to 32 KB, the extended window size which has been set to the communications flows of the transmission-side apparatuses 200a and 200b.

As described above, the reception-side apparatus 100 sets to a smaller extended window size as the available space of the receiving buffer memory 120 decreases.

It is noted that the available space of the receiving buffer memory 120 decreases to a threshold value or below, the reception-side apparatus 100 may reduces the extended window size to each of the communications flow. Here, the window size setting unit 133 of the reception-side apparatus 100 may determine the above threshold value in accordance with the size of the threshold value accounting for the entire capacity of the receiving buffer memory 120. For example, the window size setting unit 133 determines a size accounting for 20% of the entire capacity of the receiving buffer memory 120 as a threshold. Further, the window size setting unit 133 may determine the above threshold in accordance with the RTT.

It is noted in the above described example that the plural communications flows are set between the reception-side apparatus 100 and each of the plural transmission-side apparatuses. Instead, the plural communications flows may be set between the reception-side apparatus 100 and one transmission-side apparatus.

As described above, throughput can be controlled in accordance with the available space of the receiving buffer memory 120 in the modification example.

As described above, the communications apparatus in the present invention has been described, using the above embodiments and the modification examples therein; however, the present invention shall not be limited to those.

In the above embodiment and the modification examples thereof, for example, the data packet stored in the receiving buffer memory 120 is discarded in order to store a new data packet in the receiving buffer memory 120 in congested state; instead, any processing may be employed as far as the new data packet can be stored in the receiving buffer memory 120. For example, the data packet may be withdrawn from the receiving buffer memory 120, and a region may be created for overwriting upon an arrival of the retransmitted data packet.

Further, the data packet is discarded when the receiving buffer memory 120 becomes congested state in the above embodiment and the modification examples. Instead, the data packet may be discarded when the available space of the receiving buffer memory 120 becomes below a threshold greater than 0.

Moreover, when the transmission-side apparatus 200 has the communication function compatible with the SACK in the above embodiment and the modification examples, the SACK packet is transmitted to the transmission-side apparatus 200 in order to request the transmission-side apparatus 200 to retransmit the discarded packet. In addition, the TDACK packet may be transmitted to the transmission-side apparatus 200, as well. This can promptly retransmit the discarded packet from the transmission-side apparatus 200.

Further, the SACK packet, indicating the available space of the receiving buffer memory 120 in a window size, is transmitted in the above embodiment and the modification examples; meanwhile, the window size indicated by the SACK packet may be independent from the available space of the receiving buffer memory 120.

As shown in FIG. 18, for example, the communications apparatus in the present invention (reception-side apparatus 100) in the above embodiment and the modification examples is structured in a mobile phone, and the transmission-side apparatus 200 in a personal computer and a server.

Industrial Applicability

A communications apparatus in the present invention is effective in efficiently transferring data free from environmental restriction, and applicable to any communications apparatus executing reception processing based on the TCP, including a personal computer, a mobile phone, and an Internet appliance.

The invention claimed is:

1. A communications apparatus which notifies a communications counterpart apparatus connected via a network of a data amount in a window size, and receives data as large as the window size, the data being transmitted from the communications counterpart apparatus, said communications apparatus comprising:
    a storing unit for storing the data transmitted from the communications counterpart apparatus;
    a size notifying unit configured to notify the communications counterpart apparatus of the window size, the window size being larger than a capacity of said storing unit;
    a receiving unit configured to (i) sequentially receive a plurality of data packets, the plurality of data packets being the data as large as the window size and being transmitted from the communications counterpart apparatus and (ii) store the received plurality of data packets in said storing unit, the plurality of data packets being transmitted according to the window size notified by said size notifying unit;
    a processing unit configured to retrieve and process the plurality of data packets stored in said storing unit;
    a discarding unit configured to secure available space in said storing unit by discarding a data packet included in the plurality of the data packets stored in said storing unit; and
    a retransmission requesting unit configured to request the communications counterpart apparatus to retransmit the data packet discarded by said discarding unit, and
    wherein said discarding unit is configured to discard, as the discarded data packet, a data packet other than a last packet so that a last data packet transmitted from the communications counterpart apparatus is stored in said storing unit as the last packet, the last data packet being one of the data packets sequentially transmitted in accordance with the window size notified by said size notifying unit.

2. The communications apparatus according to claim 1,
wherein said retransmission requesting unit is further configured to request the communications counterpart apparatus to retransmit a data packet received by said receiving unit but not stored in said storing unit.

3. The communications apparatus according to claim 1,
wherein said processing unit is configured to retrieve in a predetermined order the plurality of the data packets stored in said storing unit, and
wherein said discarding unit is configured to discard the data packet stored in said storing unit in a case where the retrieval of the plurality of data packets from said storing unit becomes disrupted such that said storing unit cannot store a new data packet based on the capacity of said storing unit, the plurality of data packets being retrieved by said processing unit in the predetermined order.

4. The communications apparatus according to claim 3,
wherein said retransmission requesting unit is configured to request the communications counterpart apparatus to retransmit the discarded data packet by transmitting as many negative acknowledgement packets as necessary for causing the discarded data packet to be retransmitted from the communications counterpart apparatus, each of the negative acknowledgment packets indicating the data packet discarded by said discarding unit.

5. The communications apparatus according to claim 3,
wherein said retransmission requesting unit is configured to request the communications counterpart apparatus to collectively retransmit a plurality of data packets transmitted between another data packet and the last packet by transmitting to the communications counterpart apparatus an acknowledging packet indicating the other data packet and the last packet stored in said storing unit.

6. The communications apparatus according to claim 1,
wherein, when said communications apparatus simultaneously receives data at each of a plurality of communications flows,
wherein said size notifying unit is configured to (i) set a window size for each of the communications flows on a communications flow basis so that a sum of each of window sizes of the communications flows is larger than the capacity of said storing unit, and (ii) notify each of the communications flows of the corresponding set window size, and
wherein said receiving unit is configured to receive data from each of the plurality of the communications flows, and store the received data in said storing unit.

7. The communications apparatus according to claim 6, further comprising
    a priority level determining unit configured to determine a priority level for each of the communications flows,
    wherein said size notifying unit is configured to set a larger window size for a communications flow determined to have a higher priority level.

8. The communications apparatus according to claim 7,
wherein said priority level determining unit is configured to determine the priority levels in accordance with an application program executed by said processing unit.

9. The communications apparatus according to claim 7,
wherein said priority level determining unit is configured to determine a higher priority level for a communications flow transferring a moving picture than for a communications flow transferring data other than a moving picture.

10. The communications apparatus according to claim 6, wherein said size notifying unit is configured to set a smaller window size for each of the communications flows as a number of the communications flows increases.

11. The communications apparatus according to claim 6, wherein said size notifying unit is configured to set a window size for a communications flow in accordance with a propagation delay in a transmission path used in the communications flow.

12. The communications apparatus according to claim 11, wherein said size notifying unit is configured to set a larger window size for the communications flow as the propagation delay in the transmission path used in the communications flow is longer.

13. The communications apparatus according to claim 11, wherein said size notifying unit is configured to set a larger window size for the communications flow as the propagation delay in the transmission path used in the communications flow is shorter.

14. The communications apparatus according to claim 6, wherein said size notifying unit is configured to set a larger window size for a communications flow as a transmission band for the communications flow is wider.

15. The communications apparatus according to claim 6, wherein said size notifying unit is configured to reduce the window size set for each of the communications flows when available space of said storing unit becomes equivalent to a threshold value or smaller.

16. The communications apparatus according to claim 15, wherein said size notifying unit is configured to determine the threshold value in accordance with an entire capacity of said storing unit.

17. A communications method for notifying a communications counterpart apparatus connected via a network of a data amount in a window size, and receiving data as large as the window size, the data being transmitted from the communications counterpart apparatus, said communications method comprising:

notifying the communications counterpart apparatus of the window size, the window size being larger than a capacity of a storing unit which stores the data transmitted from the communications counterpart apparatus;

sequentially receiving a plurality of data packets, the plurality of data packets being (i) the data as large as the window size and (ii) transmitted from the communications counterpart apparatus;

storing the received plurality of data packets in the storing unit, the plurality of data packets being transmitted in accordance with the window size notified of in said notifying;

retrieving and processing the plurality of data packets stored in the storing unit;

discarding a data packet included in the plurality of the data packets stored in the storing unit to secure available space in the storing unit; and requesting the communications counterpart apparatus to retransmit the data packet discarded in said discarding, wherein a data packet other than a last packet is discarded as the discarded data packet in said discarding so that a last data packet transmitted from the communications counterpart apparatus is stored in the storing unit as the last packet, the last data packet being one of the data packets sequentially transmitted in accordance with the window size notified of in said notifying.

18. A non-transitory computer readable recording medium having stored thereon a computer program for a computer for notifying a communications counterpart apparatus connected via a network of a data amount in a window size, and receiving data as large as the window size, the data being transmitted from the communications counterpart apparatus, wherein, when executed, said computer program causes the computer to execute a method comprising:

notifying the communications counterpart apparatus of the window size, the window size being larger than a capacity of a storing unit which stores the data transmitted from the communications counterpart apparatus;

sequentially receiving a plurality of data packets, the plurality of data packets being (i) the data as large as the window size and (ii) transmitted from the communications counterpart apparatus;

storing the received plurality of data packets in the storing unit, the plurality of data packets being transmitted in accordance with the window size notified of in said notifying;

retrieving and processing the plurality of data packets stored in the storing unit;

discarding a data packet included in the plurality of the data packets stored in the storing unit to secure available space in the storing unit; and requesting the communications counterpart apparatus to retransmit the data packet discarded in said discarding, wherein a data packet other than a last packet is discarded as the discarded data packet in said discarding so that a last data packet transmitted from the communications counterpart apparatus is stored in the storing unit as the last packet, the last data packet being one of the data packets sequentially transmitted in accordance with the window size notified of in said notifying.

* * * * *